United States Patent [19]

Penick

[11] 4,057,813

[45] Nov. 8, 1977

[54] POCKET SIZED CAMERA

[76] Inventor: Ib Penick, 18 E. Willow Road, Wheeling, Ill. 60090

[21] Appl. No.: 631,062

[22] Filed: Nov. 12, 1975

Related U.S. Application Data

[62] Division of Ser. No. 346,288, March 30, 1973, abandoned.

[51] Int. Cl.$^2$ .............................................. G03B 15/03
[52] U.S. Cl. ..................................... 354/144; 354/148
[58] Field of Search ............... 354/288, 126, 143, 144, 354/149, 148

[56] References Cited

U.S. PATENT DOCUMENTS

| | | | |
|---|---|---|---|
| 3,374,458 | 3/1968 | Durr | 240/1.3 X |
| 3,404,612 | 10/1968 | Harvey | 354/128 |
| 3,456,567 | 7/1969 | Albedyll et al. | 354/148 |

*Primary Examiner*—John Gonzales
*Attorney, Agent, or Firm*—Wallenstein, Spangenberg, Hattis & Strampel

[57] ABSTRACT

In a pocket sized camera wherein the top and bottom walls of the housing are closely spaced relative to the front to back dimensions thereof and to the spacing between the housing end walls there is provided a multilamp flash unit-receiving socket mounted in the housing adjacent to one of the housing end walls for rotation about a horizontal axis extending in the direction of the longitudinal dimension of the camera housing and adapted to receive a multilamp flash unit so the central axis thereof corresponds with the axis of rotation of the socket. The end wall on which the flash unit-receiving socket is mounted is the end wall spaced the greatest distance from the lens opening in the front wall of the camera housing, to eliminate or minimize "pink eye" effects. The socket is rotated in a direction so that the flash lamp section of the multilamp flash unit next to be rotated into a forward position is at the top of the flash unit, so the user can conveniently see the used or unused condition of the next flash lamp section involved to be used subsequent to the front section thereof. A flash on-off control is provided on the camera housing for rendering the flash unit selectively operable or inoperable and the flash unit-receiving socket is automatically rotated one lamp section only during the first film wind operations following a flash operation independently of the position of the flash on-off switch.

The present invention has its most important utility in pocket-sized cameras, although some of the features thereof have a more general application in still cameras.

6 Claims, 33 Drawing Figures

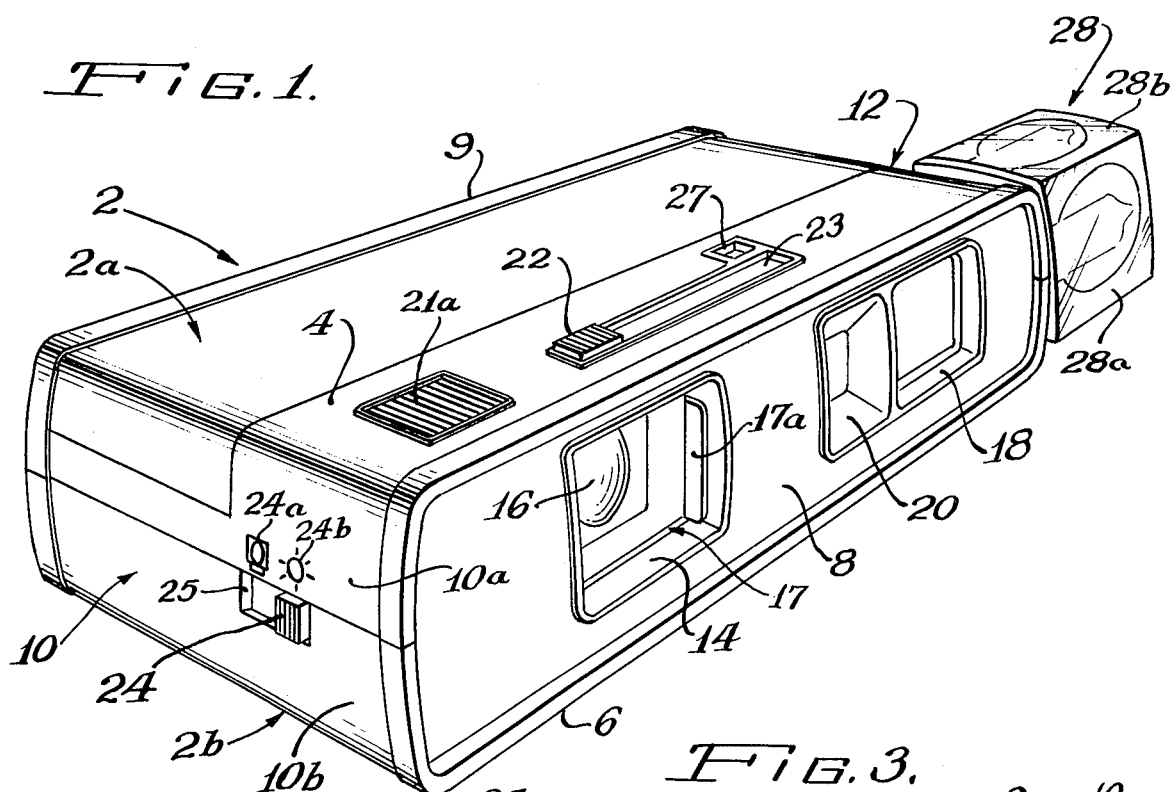
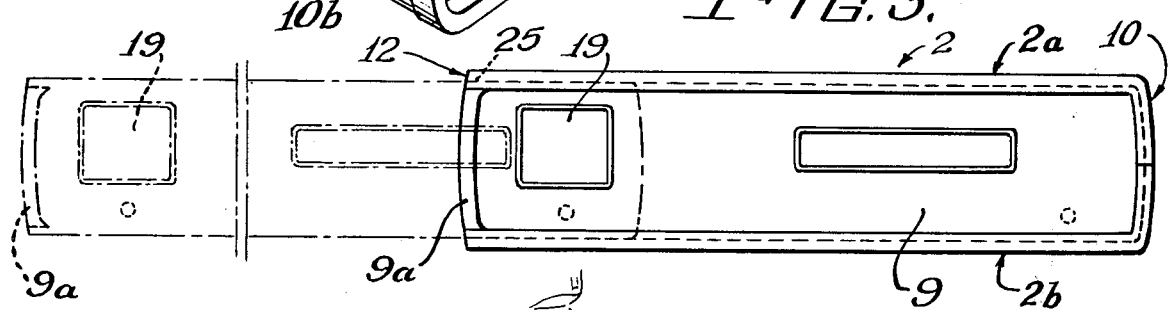
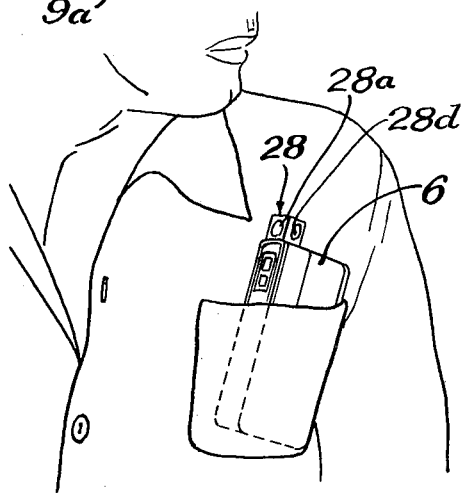

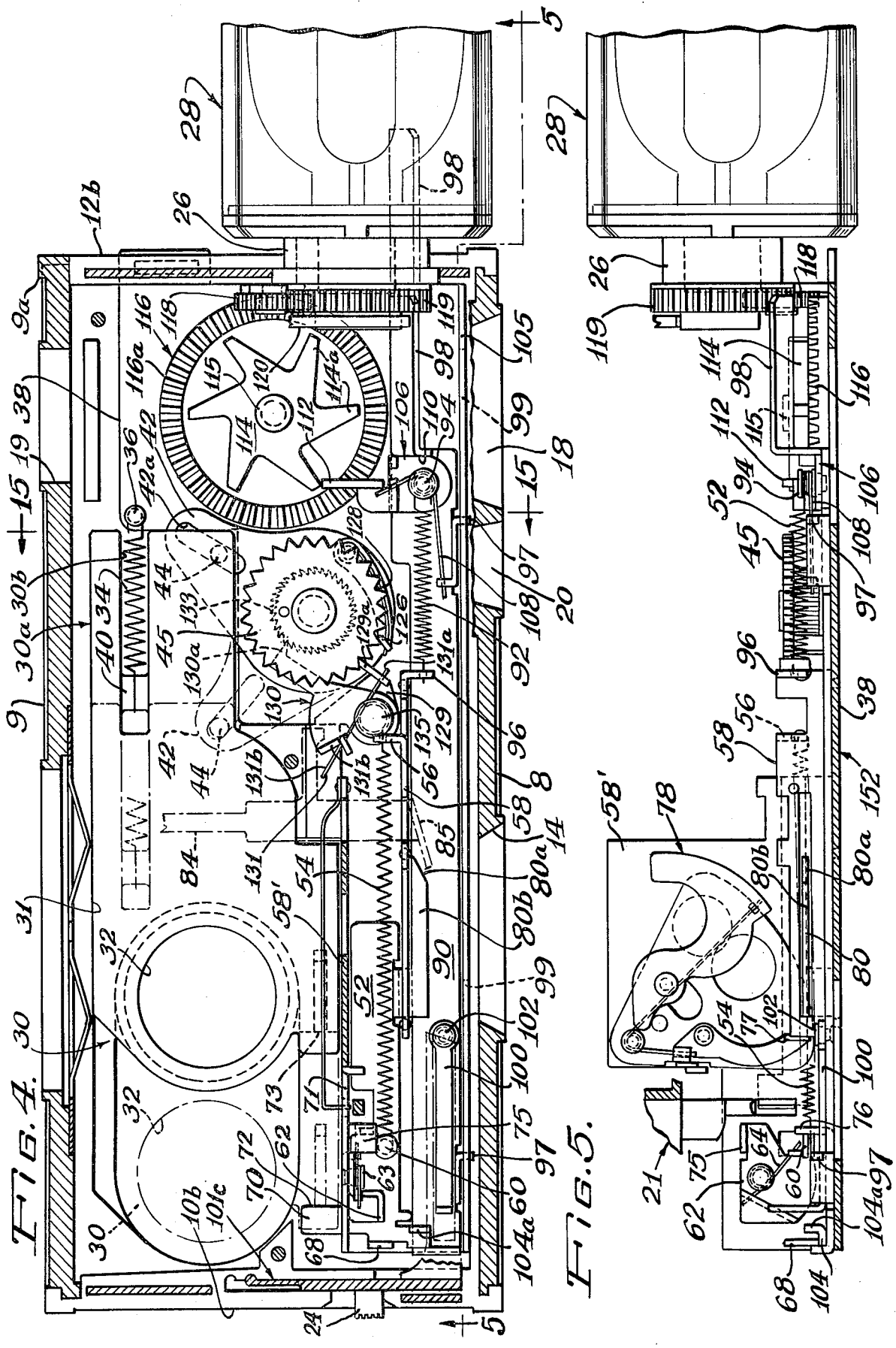

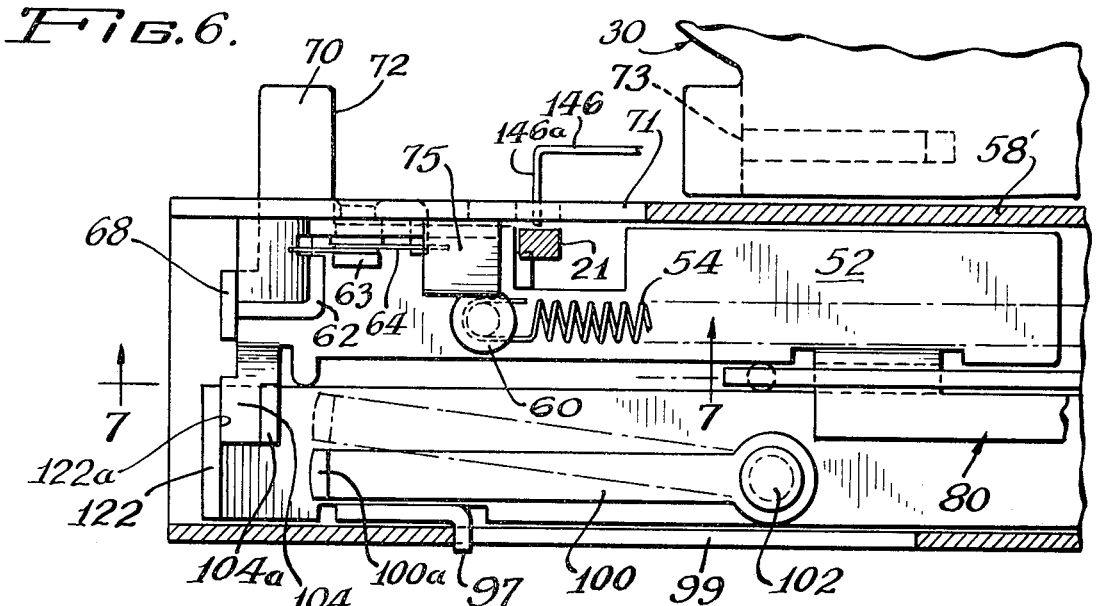
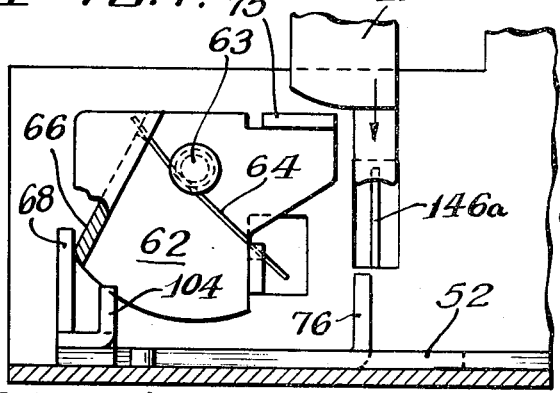
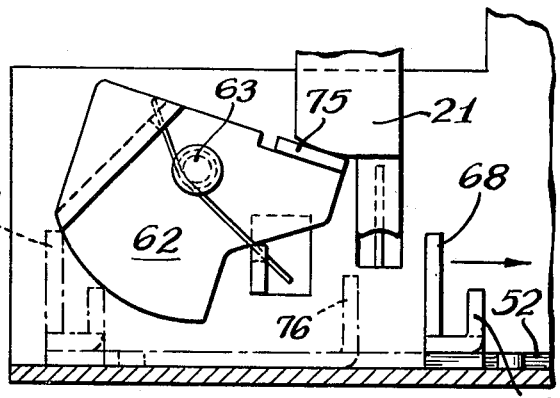
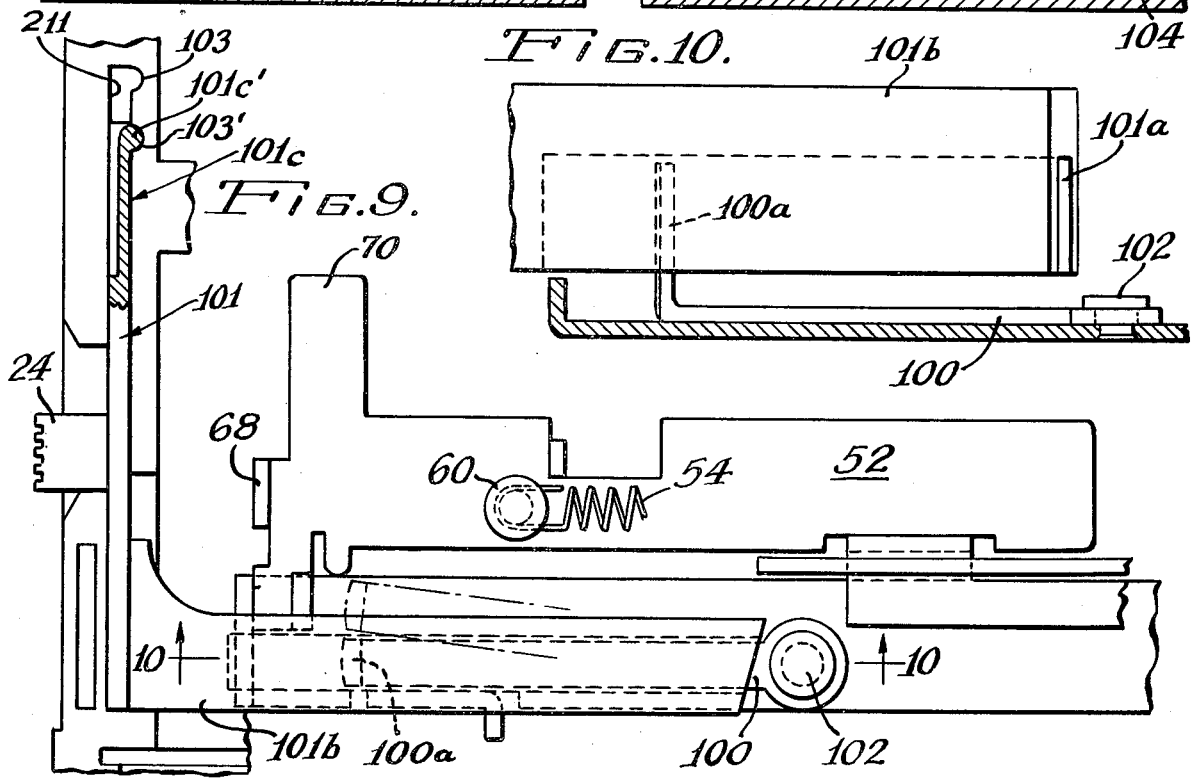

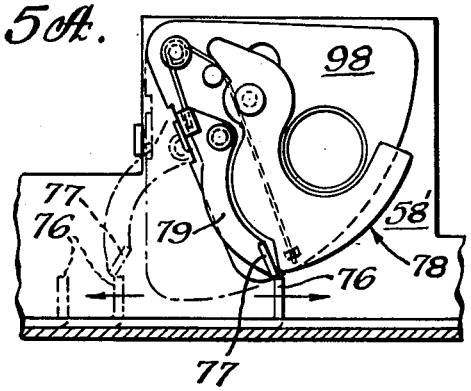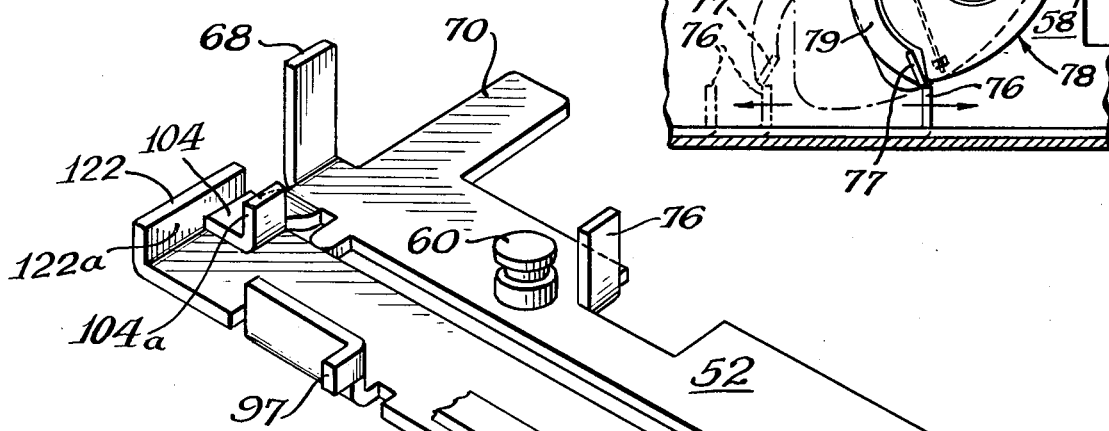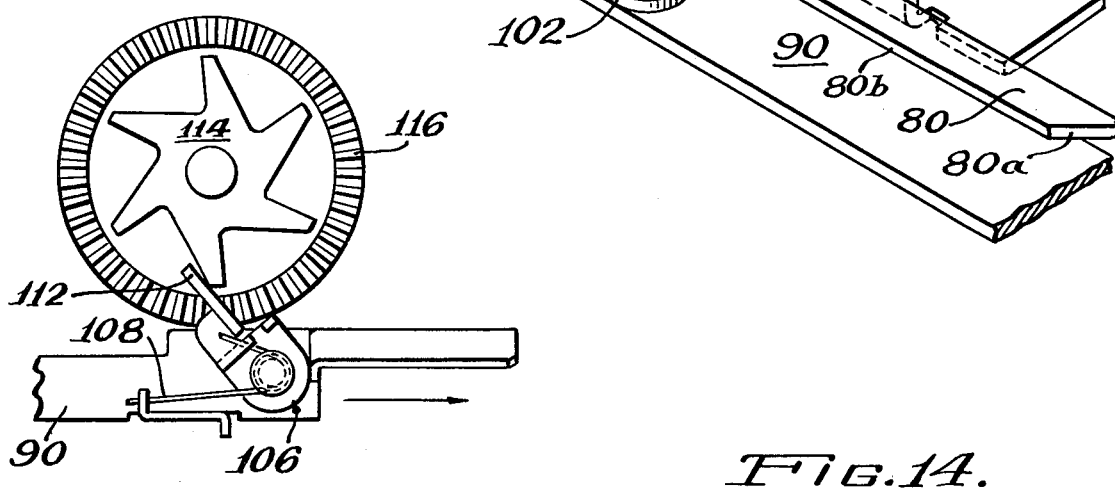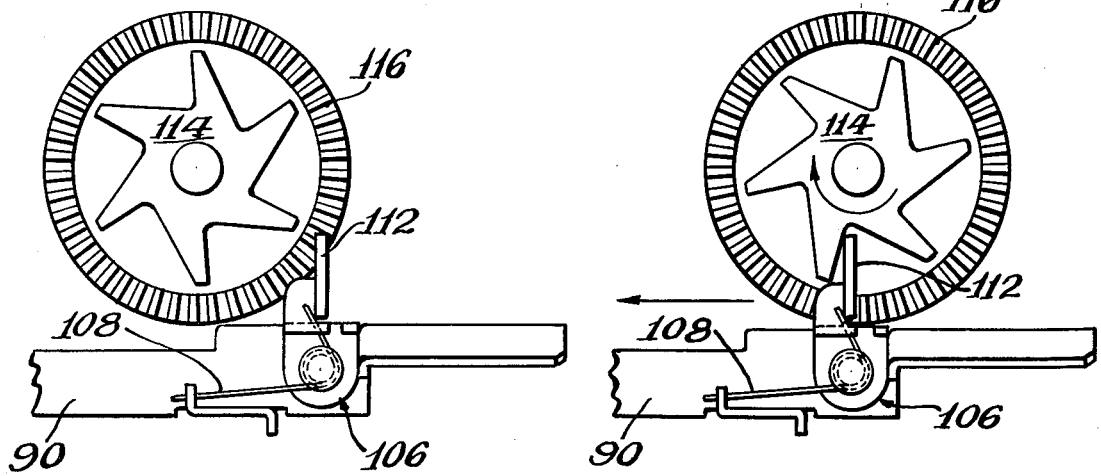

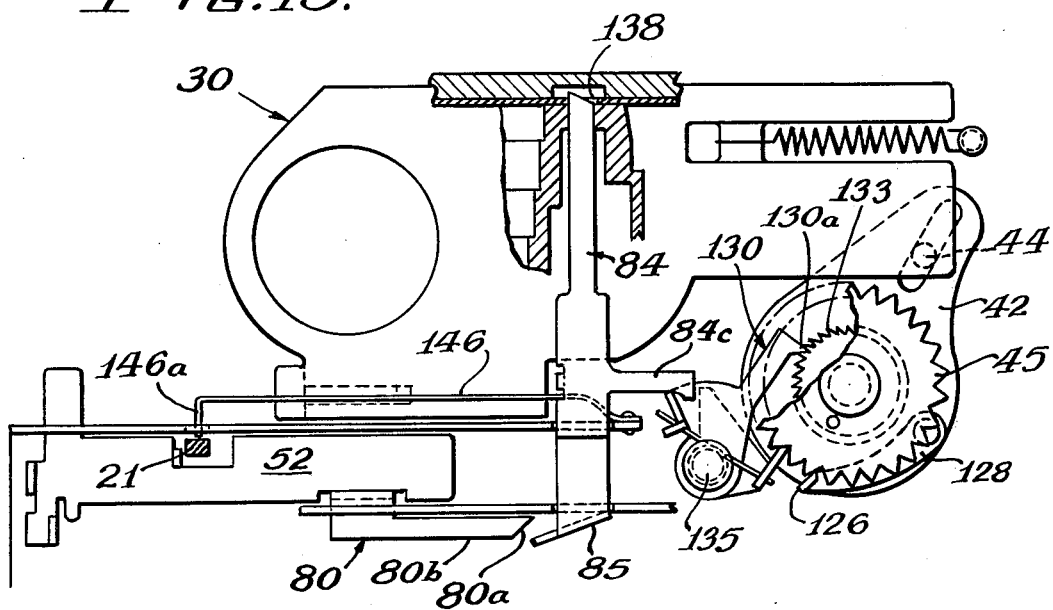

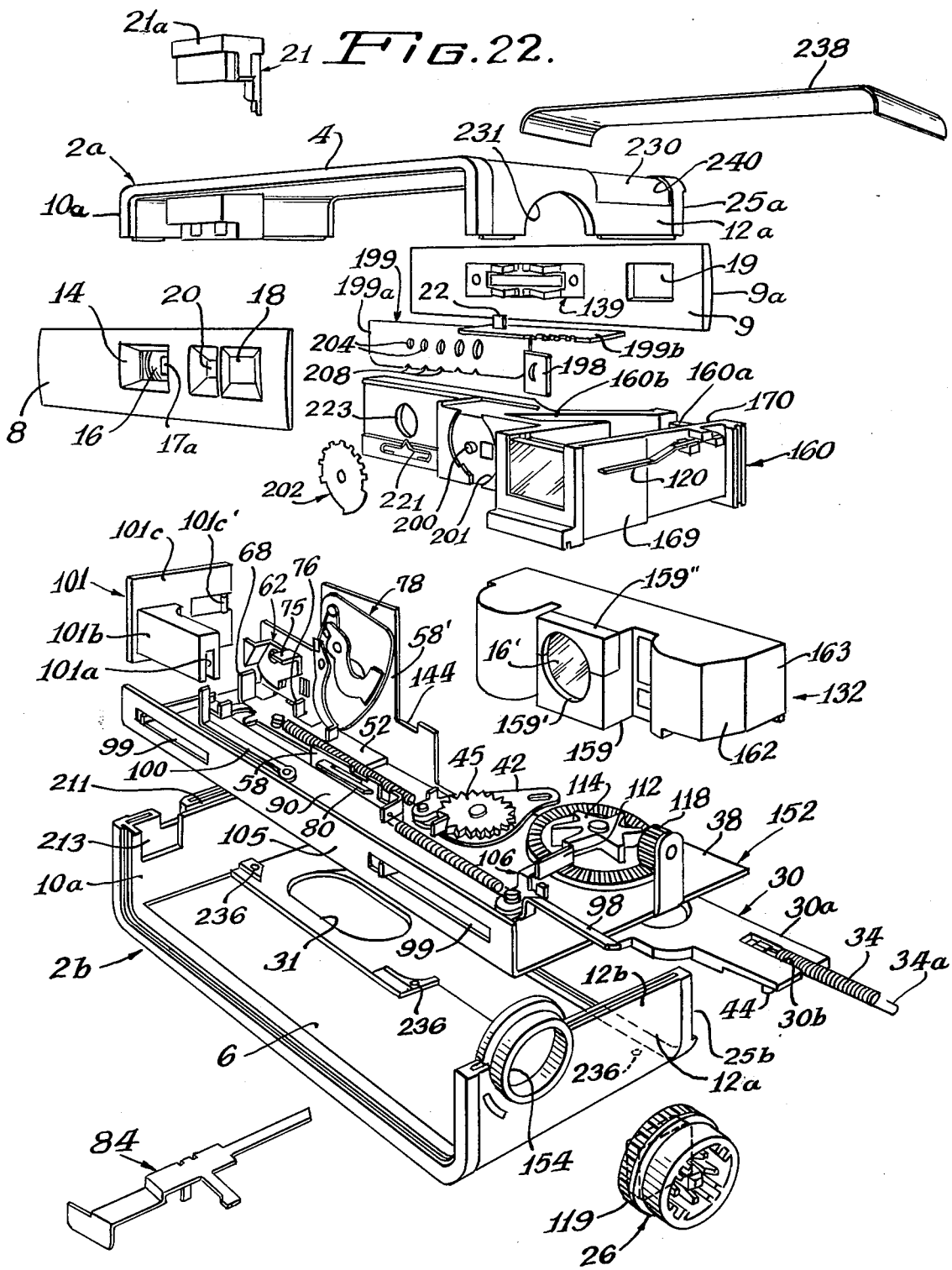

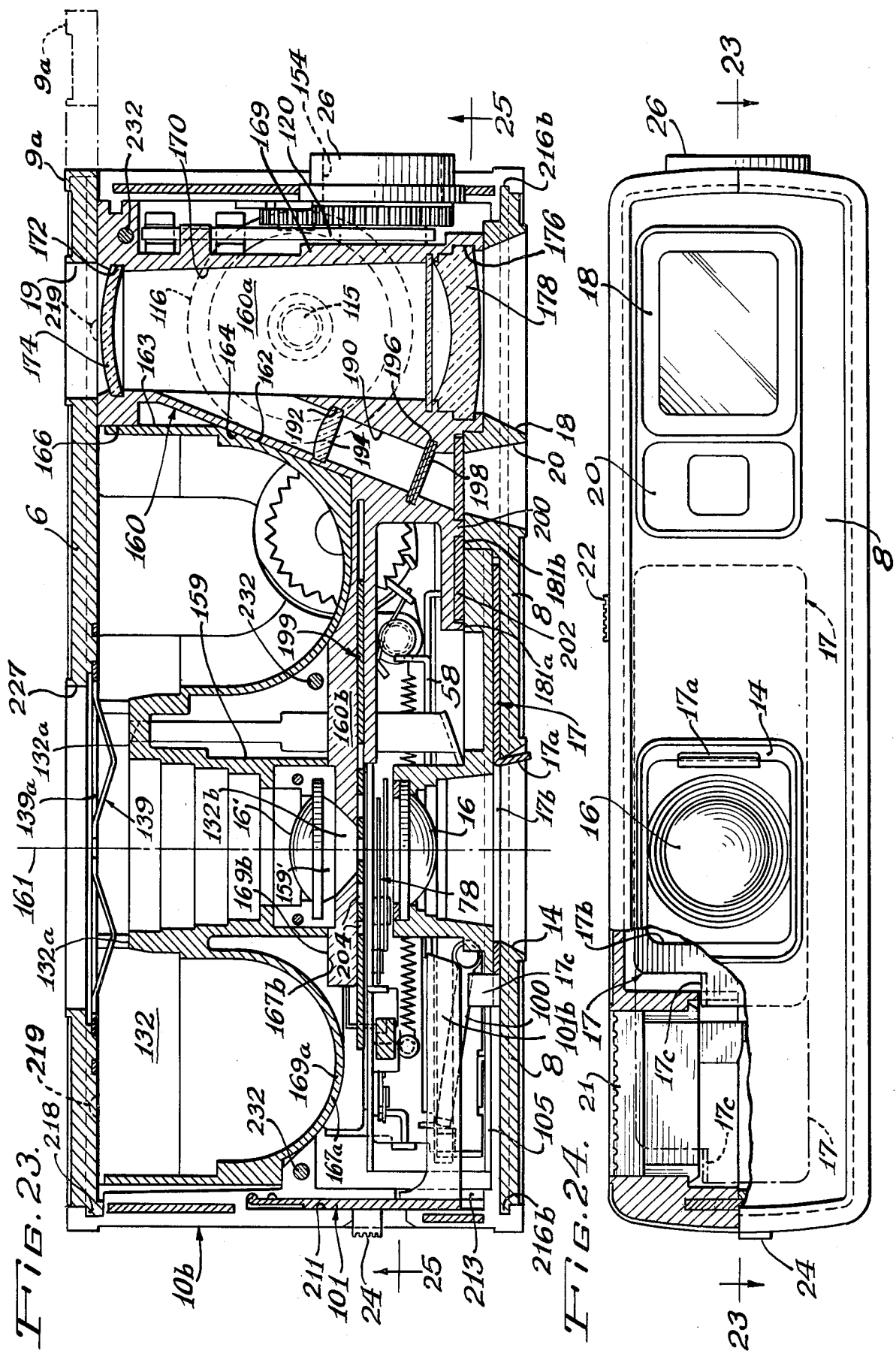

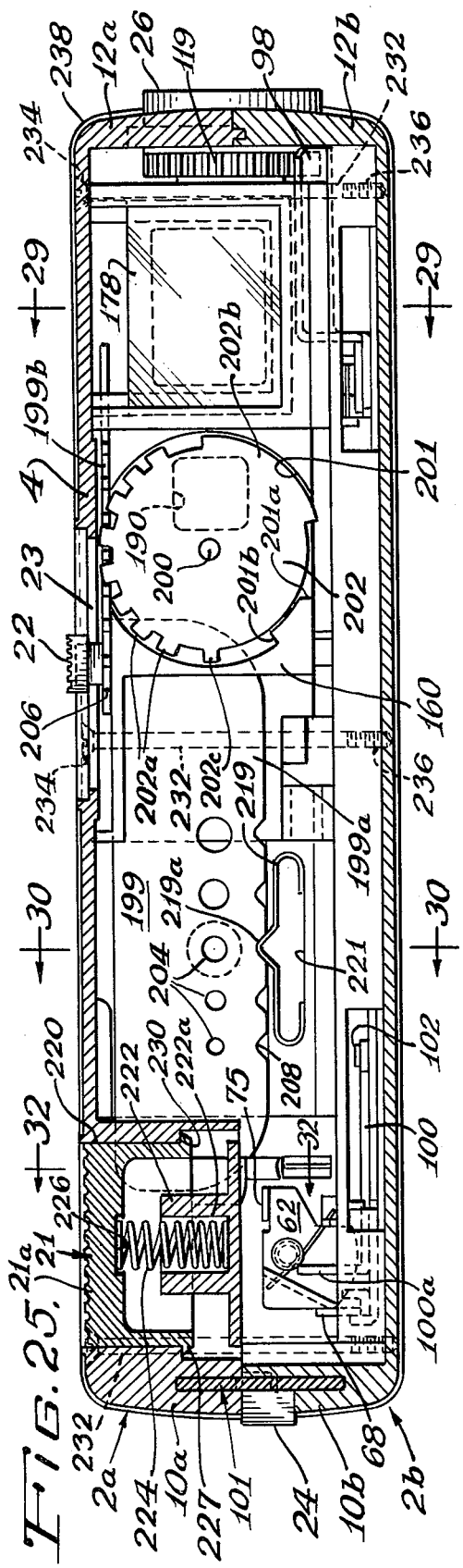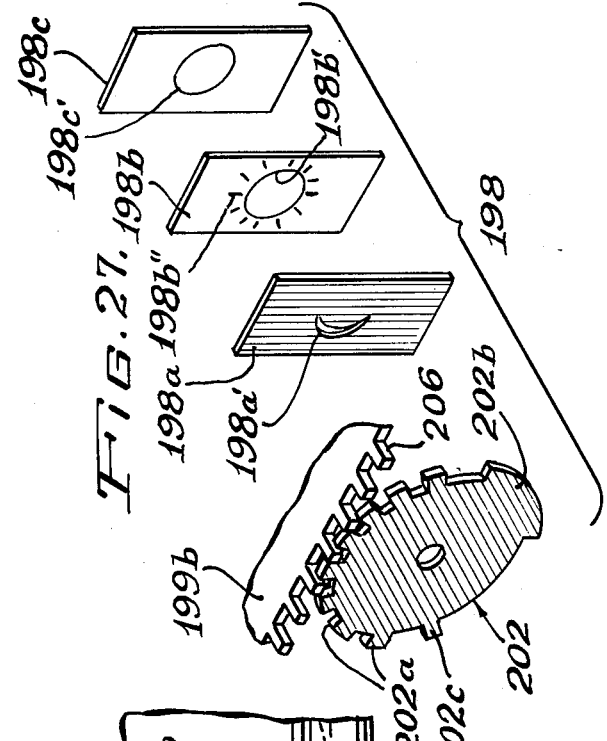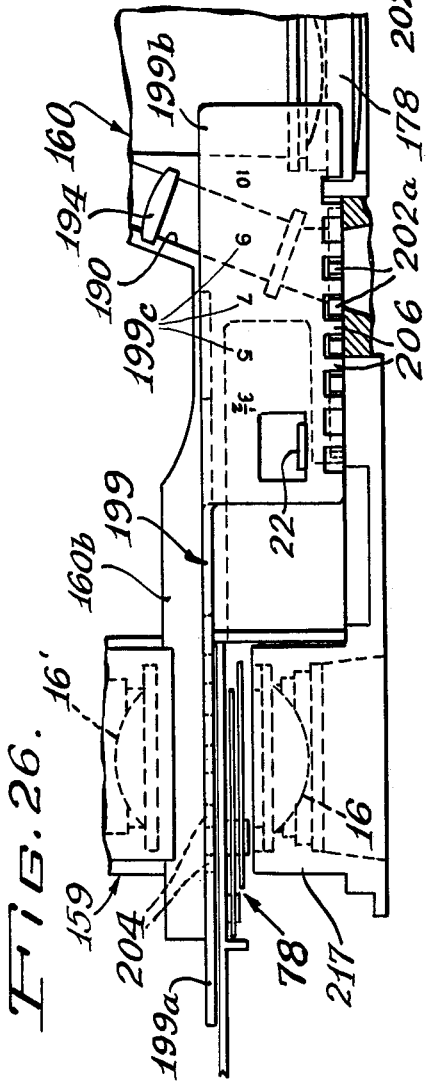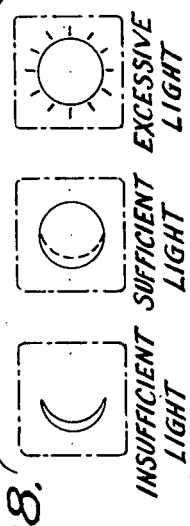

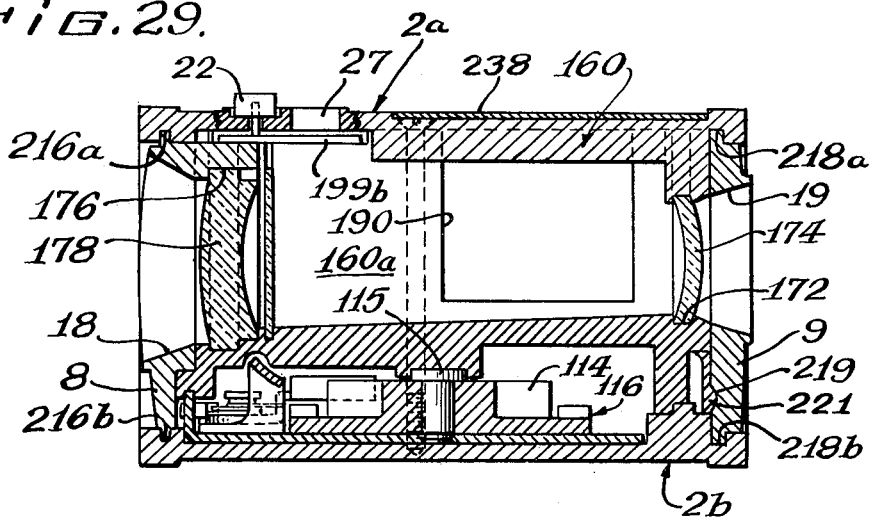
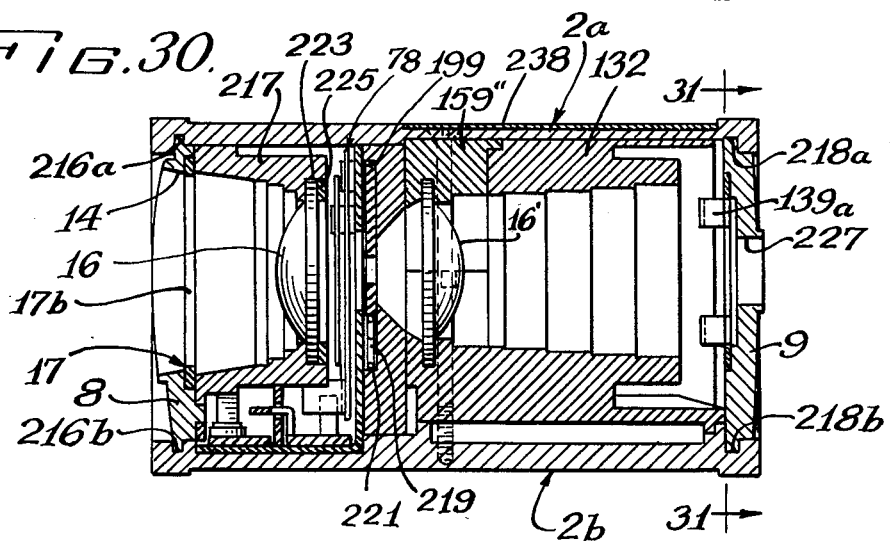
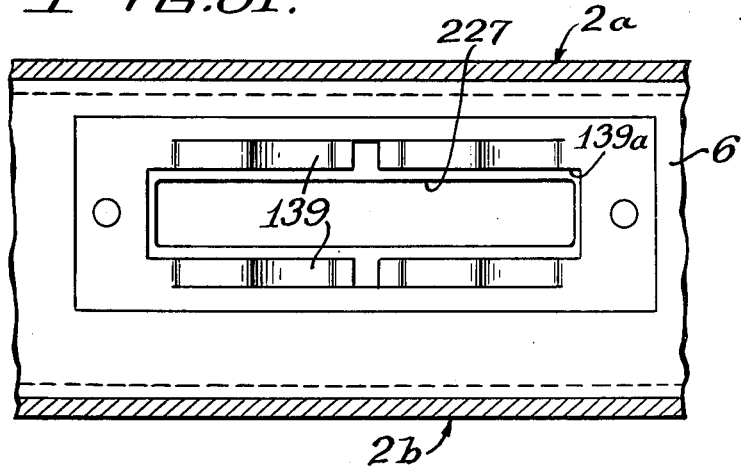
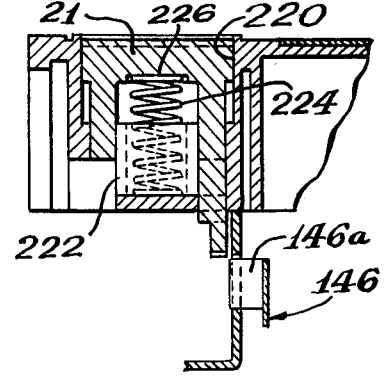

POCKET SIZED CAMERA

RELATED APPLICATION

This application is a division of application Ser. No. 346,288 of Ib Penick on POCKET SIZED CAMERA, filed Mar. 30, 1973, now abandoned.

BACKGROUND OF INVENTION

Pocket-sized cameras have recently become extremely popular for a number of reasons, including the fact that they are of such a compact size that they can be conveniently carried in a shirt pocket or the like when the flash unit is disconnected therefrom. These cameras are of a configuration such that when held in operative (i.e. picture taking) position the housing horizontally oriented top and bottom walls are the walls thereof having the largest area. The front to back dimension of the camera is less than the width of an average shirt pocket. The top and bottom walls are relatively closely spaced to provide a very thin or shallow camera housing which enables the camera to fit within a shirt pocket without unduly stretching or bulging the pocket walls. The front vertical wall of the housing generally has horizontally spaced openings thereon on opposite sides of the vertical center line thereof, behind which openings the lens and viewfinder forming means are located, and the vertical rear wall of the housing generally contains a viewfinder window. Mounted in the top wall of the housing adjacent the front margin of the camera is a rotatable socket for receiving a multilamp flash unit which, when attached to the socket, extends upwardly therefrom and presents four flash lamp and reflector sections spaced ninety degrees apart around a common vertical axis of rotation.

A depressible trigger member is generally mounted on the top wall of the housing, and when the shutter is depressed to take a picture the forwardly facing flash lamp and reflector section is operated. A simultaneous film wind and flash unit rotating operation is effected by operating a wind means on the camera housing. In such case, one of the flash lamp and reflector sections previously facing laterally outwardly of the flash unit will be rotated into a position at the front of the flash unit where, if it is an unused flash lamp and reflector section, will be effective to take a new flash picture when the depressible trigger member is again operated.

Generally, the insertion of a flash unit into the camera automatically reduces the speed of the shutter of the camera, and removal of the flash unit will automatically restore the normally higher shutter speed. Also, when the camera user desires to take a picture under ambient light conditions, to avoid wasting a flash lamp section of the flash unit he removes the flash unit from the camera, and he reinserts the flash unit into the camera when he subsequently wants to take a flash picture. In reinserting the flash unit into the camera, he must usually first examine the flash unit to determine the position of the unused flash lamp and reflector sections so he can insert the flash unit with the proper orientation wherein the first unused section faces forwardly. He cannot determine the first unused section (so the next section to be rotated into a forward position is also unused) unless he knows the direction in which the socket rotates. While the most expensive cameras of the pocket-sized type have means for sensing whether or not the forwardly facing flash lamp section is used or unused and indicating a used forwardly facing flash lamp section by a red flag in the viewfinder, the alternation between camera operation under flash and ambient light conditions still poses a great confusion and inconvenience to many users, and frequently results in unused sections of the flash unit or, in less expensive cameras not equipped with the warning flag referred to, wasted film when flash operation is desired and the flash unit does not operate because of the presence of a used flash lamp section in firing position.

Another disadvantage of the pocket-sized cameras heretofore described provided with a multilamp flash unit socket is that, where the camera is to be carried in a shirt pocket or the like, it was necessary to remove the flash unit from the camera housing before placing the camera in the pocket because the flash unit is mounted in a side of the housing which increases the bulk of the camera along the normally thin dimension thereof to a point where the camera cannot fit into a shirt pocket unless the flash unit is removed therefrom. As was previously indicated, the removal of the flash unit from the camera creates a problem of determining the proper orientation of the flash unit upon reinsertion thereof into the camera. This position of the flash unit also places the flash unit at an angle where with color film the eyes of persons taken in close-up pictures appears red or pink. To eliminate this problem in close-up photography, an extension adapter unit is placed in the socket of the camera to space the flash unit far from the lens opening.

DESCRIPTION OF INVENTION

In accordance with one of the features of the present invention, a pocket-sized camera of the general type previously described is modified in a number of aspects. In the first place the multilamp flash unit socket is placed in one of the narrow end walls of the camera housing, so that the axis of rotation of the multilamp flash unit extends horizontally from the socket and the housing end wall. The axis of rotation of the socket is most advantageously centered in the end wall so that the flash unit projects, if at all, beyond the top and bottom margins of the camera in the direction of the narrow dimension thereof to a minimum degree, to reduce or minimize the bulk of the combination flash unit and camera in the latter direction. With a camera having this socket placement in the end wall of the camera as described, it can be easily and comfortably placed in a shirt pocket or the like, with the flash unit attached by orienting the long dimension of the camera vertically and preferably with the end of the camera containing the flash unit placed at the then top of the camera.

To eliminate or reduce "pink eye" pictures without the need for any extension adapter units, the flash unit-receiving socket is mounted on the end wall which is spaced furthest from the lens opening in the vertical front wall of the camera housing, so there is a proper distance between the flash unit and the center line of the lens opening without the need for increasing the longitudinal dimension of the camera.

While there have been cameras which receive a rotatable flash lamp on or at the end wall of a camera so the longitudinal axis of the flash lamp extends transversely of the camera end wall, these have been cameras completely different from the pocketsized camera of the present invention, where such mounting of a flash lamp was dictated by considerations and needs not present in the pocket-sized camera of the invention. For example, in one prior developed full-sized still camera, a socket for receiving a single flash lamp was mounted in a vertical end wall of the camera housing along with a reflector for retraction into and out of the end wall. Also, certain miniature cameras which are much smaller than pocket-sized cameras with which the present invention deals utilize a flash unit socket adapter attached to an end wall of the miniature camera. The adapter carries on the end thereof a manually rotatable multilamp flash unit-receiving socket of greater size than the end wall of the miniature camera.

Also, while there have been cameras with a manual control for enabling the flash operation to be disabled while the rotatable flash lamp remains in place, this features was not applied in the environment where it would be most useful, i.e., when the flash lamp was mounted on an end wall of a pocket-sized camera so the flash lamp can remain at all times on the camera, i.e., even when held in the user's shirt pocket.

To this end a manually operable control (called a flash on-off control) is provided for selectively rendering the flash unit operating mechanism in the camera operative or inoperative to effect a flash operation when the flash unit remains in the cameral. To eliminate unnecessary rotation of the flash unit during a film winding operation after a non-flash operation of the camera, the coupling mechanism which interconnects the film advancing mechanism with the flash unit socket is arranged only to rotate the flash unit socket during the first film winding operation after a flash picture is taken and independently of the particular position of the flash on-off control. This latter feature of the invention is very important because it is not at all uncommon for a person to take a picture and then to postpone the film winding operation until sometime later after he may have moved the flash on-off control to the flash "off" position. If the flash unit socket rotating operation were to require the flash on-off control to be in its flash "on" position, it can be seen that an unused flash lamp section may be undesirably in an operative position when the user subsequently moves the flash on-off control to the flash "on" position before a film winding (and hence a flash unit rotating) operation. A very simple and effective arrangement of shutter and flash unit operating mechanism to be described is provided in the most preferred form of the invention for effecting the desirable result that a flash unit rotating operation takes place only during the first winding operation following a flash picture taking operation, independently of the position of the flash on-off control.

In accordance with a still further feature of the present invention, the flash unit socket rotating mechanism is designed so that the socket is rotated in direction where only the flash lamp section next to be rotated into an operative (forwardly facing) position will be at the top of the flash unit, so the user can view the used or unused condition of the latter flash lamp section by looking down on top of the same. If the user sees that the flash lamp section involved is a used section, he knows that he must replace the flash unit before the next film winding (and hence the next possible socket rotating) operation. Since it is not usual for a camera user to check the condition of a flash unit immediately after taking a picture, the desirable result is best achieved by instructing the user to carry out each film winding operation only immediately prior to each picture taking operation after checking the condition of the top flash lamp section (whether or not he desires to take a fresh picture).

Cameras generally have a shutter operating mechanism which includes a hammer member held in a cocked position until a manually operable shutter trigger is depressed to release the cocked hammer which moves into a shutter operating (and in some cases a film metering pin release) position. The hammer member usually triggers the operation of a flash lamp operating member which moves independently of the hammer member once it is triggered thereby into operation. Where the flash lamp is a Magi-Cube type unit which fires when a firing pin enters the flash unit to trip a percussion member, the degree of opposition of the percussion member to the striking force of the firing pin varies with the age of a particular flash unit, which varies the precise instant at which the flash unit ignites relative to the instant the shutter opens. In accordance with a specific aspect of the invention, the flash operation is directly controlled by what will be referred to as a firing pin member which, except for a flash operation, is unaffected by the movement of the hammer member. When the aforementioned flash on-off control is moved to the "on" position, a follower member carried by the firing pin member is pivoted into a position where a portion of the hammer member will engage the same and carry the firing pin member along with it when the hammer member is released. Any opposition to the movement of the firing pin member by a stiff percussion member of the flash unit similarly affect the hammer member pushing the firing pin member into its final flash unit firing position, so that the desired synchronism between the initiation of a shutter opening operation and the flash unit firing operation is not disturbed. The inertia of the firing pin member pushed by the hammer member also has the effect of slowing down the speed of movement of the hammer member, thereby automatically effecting a slower shutter speed which is desirable for flash operation. In the case where the inertial effects of the firing pin member is insufficient to accomplish desired shutter speed reducing slowdown of the hammer member, a spring is used which increases the opposition to the movement of the firing pin member to the necessary degree to produce the desired shutter speed. This feature of the invention has the advantage that under poor light conditions on a remote objective where flash operation is ineffective, to enhance the lighting conditions a desired slower shutter speed can be obtained by moving the aforementioned flasher on-off control to the "on" position when a flash unit is removed from the flash unit socket. In the prior art cameras, a flash unit must be inserted in the camera to effect a slow down in the speed of operation of the camera, and to avoid wasting a flash lamp camera manufacturers have suggested the placement of a used flash unit into the flash unit socket to obtain a slow shutter speed. In the present invention where the movement of the firing pin member is a function solely of the position of the flasher on-off control, it is not necessary to place a flash unit in the camera to obtain a slower shutter speed.

The aforementioned firing pin member is most advantageously reset to its initial inoperative position upon the return or reset stroke of the hammer member occuring when a film wind operation takes place. Means are provided on the firing pin member which effects the rotation of the flash unit socket only upon the return of the firing pin member to its inoperative position. Since the firing pin member remains in its inoperative position until another flash operation is desired, it can be seen that the flash unit will only be rotated during the first return stroke operation of the hammer member following a flash picture taking operation.

Other aspects of the invention deal with other details of the camera. These and other advantages and features of the invention will become apparent upon making reference to the specification to follow, and the drawings.

DESCRIPTION OF DRAWINGS

FIG. 1 is a perspective view larger than full size of a pocket-sized camera constructed in accordance with the present invention;

FIG. 2 illustrates the camera in FIG. 1 supported in a shirt pocket with a multilamp flash unit attached thereto;

FIG. 3 is a rear view of the camera shown in FIG. 1;

FIG. 4 is a horizontal plane sectional view just below the center portion of the camera shown in FIG. 1, with parts removed to expose the shutter, film metering, film winding, and flash unit operating portions of the camera.

FIG. 5 is a view of the apparatus shown in FIG. 4, taken along viewing planes identified by reference lines 5—5;

FIG. 5A is an enlarged fragmentary view of the shutter and shutter-operating portions of the camera;

FIG. 6 is a fragmentary enlarged view of the portion of the camera shown at the lefthand end of FIG. 4;

FIG. 7 is a sectional view through a portion of the camera seen along section line 7—7 in FIG. 6, and shows the manner in which the hammer member is latched in its cocked position;

FIG. 8 is a view corresponding to FIG. 7 after the trigger member has been depressed to tilt a latching member to release the hammer member from its cocked position;

FIG. 9 is a fragmentary horizontal sectional view through a portion of the camera illustrating the manner in which the flash, on-off control member interfits with an abutment-forming member carried by the firing pin member;

FIG. 10 is a sectional view through FIG. 9, taken along section line 10—10;

FIG. 11 is a perspective view of the hammer and firing pin members with the latter member partly broken away;

FIGS. 12-14 illustrate the different positions of the pivotable flash unit-receiving socket advancing member during the forward and return strokes of the firing pin member;

FIG. 18 is a horizontal sectional view of a portion of the camera shown in FIG. 4 during a film winding operation when a film metering member thereof is positioned so the end thereof is urged against the film at a point in front of a film metering aperture;

FIG. 19 is a view corresponding to FIG. 12 showing the end of the film metering member positioned within a film metering aperture in the film at the end of a film winding operation.

FIG. 22 shows an exploded view of the entire camera illustrating the various sub-assemblies of the camera;

FIG. 23 is a horizontal sectional view through the camera, as seen along section line 23—23 in FIG. 24;

FIG. 24 is a front broken away view of the camera;

FIG. 25 is a vertical sectional view of the camera, taken generally along section lines 25—25 in FIG. 23 and with various elements at the front of the camera removed to expose the parts therebehind;

FIG. 26 is a fragmentary plan view of the light meter forming portions of the camera;

FIG. 27 is an exploded view of various elements making up the light meter portion of the camera;

FIG. 28 illustrates the three different indications visible in the viewfinder respectively for insufficient, sufficient and excessive light conditions which indications are provided by the light meter portion of the camera;

FIG. 29 is a transverse vertical sectional view through the camera shown in FIG. 25, taken along section line 29—29 therein; showing the details of the viewfinder portion of the camera;

FIG. 30 is a transverse sectional view through the camera shown in FIG. 25, taken along section line 30—30 therein and showing the lens portion of the camera;

FIG. 31 is a fragmentary sectional view through the camera shown in FIG. 30, taken along section line 31—13 therein and showing the spring mounted on the rear wall of the camera; and FIG. 32 is a fragmentary sectional view through a portion of the camera shown in FIG. 25, taken along section line 32—32 therein and showing the trigger member mounting details.

DESCRIPTION OF PREFERRED FORM OF INVENTION

Figure 15:
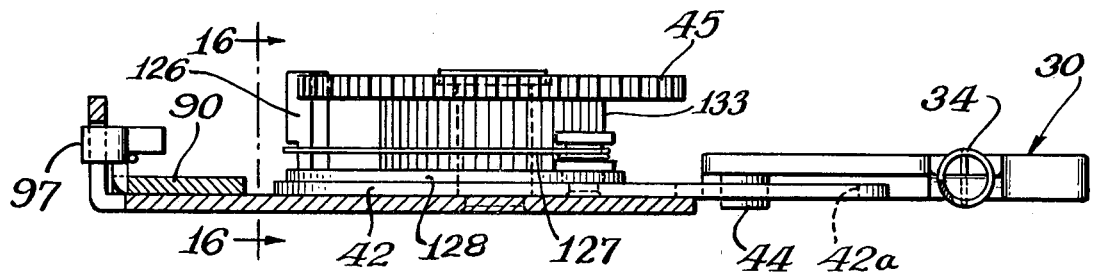
FIG. 15 is a fragmentary vertical sectional view of a portion of the mechanism shown in FIG. 4, taken along section line 15—15 thereof.

Refer now to FIGS. 1-3 which illustrate a most preferred form of the present invention, namely a camera having a housing 2 of such a narrow and thin configuration that it can readily fit within a skirt pocket or the like, as shown in FIG. 2. Referring to FIGS. 1-3 the camera housing 2 includes upper and lower housing halves 2a and 2b defining elongated horizontal top and bottom walls 4 and 6 having a front to rear dimension less than the width of an average shirt pocket. (For example, the top wall may have a length of 4.5 inches and a width of 2.0 inches.) Walls 4 and 6 are very closely spaced together to form a camera housing of a very thin compact configuration, so it can readily fit into the shirt pocket without unduly bulging the same (see FIG. 2). The camera housing has relatively narrow horizontally elongated front and rear vertical walls 8–9, and end walls 10-12 formed by the confronting vertical wall positions 10a—10a of the confronting housing halves 2a—2b. The front wall 8 has on one side of a vertical center line thereof an opening 14 behind which are located lens elements, one of which elements 16 is visible in FIG. 1. Also a sliding door member 17 having a handle 17a is mounted for sliding movement over the opening 14 to act as a dust cover when the camera is not in use. on the other side of the aforementioned vertical center line of the front wall 8 is a viewfinder opening 18 and a light meter opening 20 behind which openings respectively are located elements which respectively provide a view of the object in a viewfinder opening 19 in the rear vertical wall 9 of the camera housing and a light intensity indication which communicates to the user whether the lens opening is of the correct size for the light conditions involved.

The rear vertical wall 9 is shown in FIG. 3 mounted for horizontal sliding movement through a slot 25 in end wall 12 into a position shown in dashed lines to provide an opening into the camera housing for passage of a film cartridge. The rear wall 9 may include a finger-engaging portion 9a for grasping the wall. Projecting from an opening in the top wall 4 of the camera is the finger-engageable or handle portion 21a of a trigger member 21 (FIG. 7) which handle portion when depressed operates the shutter mechanism of the camera in a manner to be described. The trigger member is not depressible when the sliding door member 17 is pulled into the opening 14. Also mounted on the top wall is a slidable control member 22 which adjusts the lens opening of the camera. A slot 23 is provided in the top wall of the housing in which the slidable control member 22 can move. The top wall 4 has a window 27 through which a number is visible indicating the selected distance between the camera and subject for flash operation to avoid over or under exposure of flash pictures. (For flash operation, movement of the control member 22 varies the lens opening because it is desirable to vary the lens opening according to this distance.) This control member is also preferably adjusted under ambient light conditions to obtain a desired light meter indication in the viewfinder opening which indicates a proper lens opening.

On the end wall 10 of the camera housing nearest the lens opening 14 in the front wall 8 of the camera housing there is provided the finger-engageable or handle portion 24 of a flash control member to be described. The handle portion 24 of the flash control member is movable in a slot 25 in the camera housing, adjacent one end of which is an indicia 24a which is preferably a symbol identifying a flash bulb indicating flash operation and adjacent the opposite end of which is an indicia 24b which is most advantageously the symbol of a radiating sun indicating camera operation under ambient light conditions. (The two extreme positions of the handle portion 24 are sometimes described as flash "on" and "off" positions thereof.) As will be explained in more detail hereinafter, when the handle portion 24 of the flash control member is adjusted to its flash "on" position, the forwardly facing lamp and reflector section 28a of a multilamp flash unit 28 preferably of the percussion type is operated upon depression of the handle portion 21a of the trigger member 21. On the other hand, when the handle portion 24 of the flash control member is moved to its flash "off" position, depression of the handle portion 21 of the trigger member will not result in the firing of the flash unit 28. Accordingly, it is not necessary to remove the flash unit 28 from the camera housing until all the lamp and reflector sections thereof have been used.

The flash unit 28 is removably insertable into a rotatably mounted flash unit-receiving socket 26 mounted in the housing vertical end wall 12 spaced the furthest distance from the lens opening 14 of the housing, so that the flash unit is spaced a maximum distance from the lens opening 14 to minimize or eliminate "pink eye" effects on close up pictures of human beings. For example, the spacing between the outer face of the socket 26 and the center line of the lens opening 14 may be 3.0 inches for satisfactory results. The multilamp flash unit 28, as illustrated, has four flash lamp and reflector sections 28a, 28b, 28c and 28d spaced ninety degrees apart around a central axis which is coextensive with the axis of rotation of the flash unit-receiving socket 26 which is rotated in a manner to be described. The socket 26 is rotated in response to the first pull on a film wind member 30 (FIG. 4) preferably slidable in a slot 31 formed in the bottom wall 6 of the camera housing. The mechanism which couples the sliding movement of the film wind member 30 to the socket 26 is such that the flash unit 28 will rotate in a clockwise direction as viewed in FIG. 1, so that the uppermost lamp and reflector section 28b of the flash unit 28 will be next rotated to the forwardly facing position of the flash unit 28, where it becomes the next operable section of the flash unit. In this way, the user of the camera by looking down upon the upwardly facing lamp and reflector section of the flash unit 28 can readily see whether that section of the flash unit is used or unused, and if it is a used section he will remove the flash unit 28 before he effects the next film winding operation. As previously indicated, the user of the camera is instructed generally not to effect a film winding operation, (i.e. to pull on the film wind member 30) until just prior to the time he plans to take a picture and before he adjusts the handle portion 24 of the flash control member to a new position. He is instructed then to first examine the position of the handle position 24 of the flash control member which indicates whether or not the last picture taken was a flash picture. If it was a flash picture, and if the camera user then observes that the uppermost lamp and reflector section is an unused section, he is instructed to carry out a film winding operation, and if the uppermost lamp and reflector section is a used section he is instructed to replace the flash unit with a new flash unit. These instructions are useful because, in the most preferred form of the invention, the flash unit 28 will be advanced (upon the first pull of the film wind member 30) under the circumstances described only if the previously taken picture was a flash picture. Thus if the previously taken picture was not a flash picture, a film wind operation will not advance the flash unit 28 and the forwardly facing lamp and reflector section thereof will be an unused section. Under these circumstances, the presence of a used section at the top of the flash unit would not indicate the need to replace the flash unit until after the next picture is taken.

The film wind member 30 as illustrated has a finger receiving aperture 32 engageable by one of the fingers of the user which pulls the film wind member 30 to the left as viewed in FIG. 4. The film wind member 30 is urged into the righthand solid position by a spring 34 extending between a pin 36 projecting from a stationary wall 38 in the camera housing and an anchoring arm 40 on the film wind member. The film wind member 30 is coupled to a pawl-carrying member 42 in any suitable way, as by means of a pin 44 extending into an elongated slot 42a in the film advance member. Movement of the film wind member to the left imparts counter-clockwise movement to the member 42 to advance a drive gear 45 which meshes with a gear in the film cartridge used in the camera, in a manner to be later described. The film wind member 30 is locked in its righthand position by film wind locking mechanism to be described until depression of the handle portion 21a of the trigger member 21. It generally takes a number of reciprocations of the film wind member 30 to move the film one frame distance.

Depression of the trigger member 21 releases a hammer member 52 from which a lefthand cocked position as viewed in FIG. 4, which is then drawn to the right by a spring 54 anchored between a tab 56 projecting from a wall 58 in the camera housing and a pin 60 carried by the hammer member 52. The hammer member is retained in a cocked lefthand position against the restraining force of the spring 54 by a latch member 62 pivotably mounted upon a pivot pin 63 and urged by a spring 64 in a clockwise direction where a latching shoulder 66 thereon (FIG. 7) engages an arm 68 projecting from the hammer member 52. When the trigger member 21 is depressed, as seen in FIG. 8 it pushes down upon a lug 75 forming part of the latch member 62 to pivot the same in a clockwise direction to a point where the arm 68 of the hammer member 52 is free to move to the right under the force of the spring 54.

The hammer member 52 is, in part, guided for horizontal movement in the camera housing by means including a guide projection 70 which rides in a slot 71 formed in a wall 58'. The guide projection 70 of the hammer member 52 has a laterally facing shoulder 72 which is engaged by a surface 73 on the film wind member 30 so that the hammer member 52 is returned to its initial cocked position by the first pull on the film wind member 30. Such movement imparted to the hammer member 52 by the film wind member 30 will bring the arm 68 of the hammer member behind the latching shoulder 66 of the latch member 62.

The hammer member 52 has a shutter operating lug 76 which strikes a shutter operating projection 77 (FIG. 5A) forming part of a shutter assembly 78 which may be a conventional shutter mechanism or the like wherein the time the shutter is in its open position depends upon the speed with which the shutter operating lug 76 strikes the projection 77 of the shutter mechanism 78. As the lug 76 on the hammer member moves to the right after initially engaging the projection 77, the shutter mechanism is pushed upwardly to provide a light opening for the lens system until finally the lug 76 will pass by the projection 77, whereupon the shutter mechanism will return to its initial position. Upon the cocking of the hammer member 52 during the first pull on the film wind member, the resulting lefthand movement of the hammer member 52 requires the lug 76 to pass by the aforementioned projection 77 of the shutter mechanism 78. Accordingly, projection 77 is suitably mounted on a spring urged pivoted member 79 which permits the projection 77 to pivot to the left as the lug 76 engages the same from the right side thereof as viewed in FIG. 5A.

Another function performed by the movement of the hammer member from its cocked position is the withdrawal of a metering pin 84 from a metering aperture of the film (which metering operation will be more fully described hereinafter), and to this end the hammer member 52 has a longitudinally extending metering member operating arm 80 with a tapered leading edge portion 80a merging with a straight longitudinally extending edge portion 80b. One end of the film metering member 84 has an inclined shoulder 85 which is initially engaged by the tapered front end edge portion 80a of the metering member operating arm 80 and then by the straight edge portion 80b thereof which retains the film metering member in a retracted position for a substantial extent of the movement of the hammer member 52 for reasons to be explained.

Another function performed by the hammer member 52 carried out only when the handle portion 24 of the flash control member is in its flash "on" position is the movement of a firing pin member 90 which is urged by a coil spring 92 or the like into a lefthand position as shown best in FIG. 4. The coil spring 92 is shown anchored between a stationary pin 94 projecting from the firing pin member 90 and a lug 96 extending from the wall 58. The firing pin member 90 has a firing pin 98 at its right hand end thereof as viewed in FIG. 4, which passes through the socket 26 and enters the flash unit 28 when the firing pin member 90 is moved fully to the right in a manner to be described. The spring 92 is under some initial tension which pulls the firing pin member 90 to the left. The firing pin member 90 is guided for horizontal movement over a limited extent by lugs 97—97 passing within slots 99—99 formed in a wall 105 in the camera housing.

The movement of the hammer member 52 to the right upon its release will carry the firing pin member 90 with it when abutment-forming member 100 pivotably mounted upon a pin 102 is moved into the path of movement of a vertical lug 104a extending from a horizontal leg 104 projecting laterally from the lefthand end of the hammer member 52. As best shown in FIG. 10, the abutment-forming member 100 has a transversely extending end portion 100a encompassed by the defining walls of a slot 101a in a lateral arm 101b extending from the body portion 101c of the flash control member 101 identified generally by reference numeral 101 in FIGS. 9 and 10. When the handle portion 24 of the flash control member is moved to the left as viewed in FIG. 1 (or upward as viewed in FIG. 9), the abutment-forming member 100 is pivoted into the immediate vicinity of the lug 104 of the hammer member 52. In such case, as soon as the hammer member 52 is released, the lug 104a will engage the end of the abutment-forming member 100 and longitudinally move the firing pin member 90 to the right against the force of the coil spring 54. Both the weight of the firing pin member 90 and the increased tension on the coil spring 92 as the firing pin member 90 is moved to the right act as a substantial drag on the movement of the hammer member 52, thereby substantially slowing the speed of movement thereof to a point where it strikes the shutter operations projection 77 of the shutter mechanism 98 at such a slow speed that the time during which the shutter mechanism is opened is greatly increased.

Figure 17:
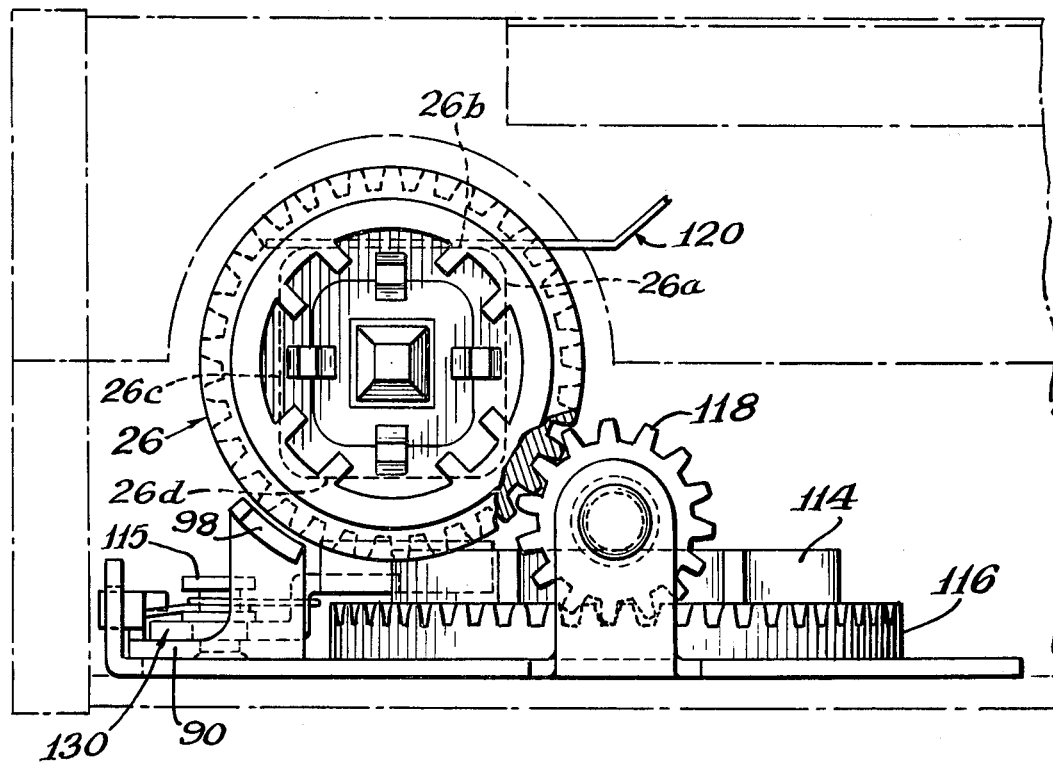
FIG. 17 is a fragmentary view of the flash unit-receiving socket viewed from one end of the camera with the adjacent end wall thereof broken away.

The firing pin member 90 carries a socket rotating member 106 which is pivotably mounted about the aforementioned pin 94 to which the spring 92 in anchored, and is urged by a spring 108 in a clockwise direction against a shoulder 110 (FIG. 4) which permits the member 106 to be rotated in a counterclockwise but not in a clockwise direction. The member 106 has a pawl 112 which is moved against one of the teeth 114a of a star-wheel 114 mounted for rotation about a pivot pin 115. The star-wheel 114 forms an integral extension of a plate gear 116 having teeth 116a formed in the periphery thereof. Meshing with the gear teeth 116a is a pinion 118, in turn, meshing with the gear-forming portion 119 of the socket 26. As best shown in FIG. 17, the socket 26 has flattened portions 26a, 26b, 26c and 26d spaced ninety degrees apart. A spring member 120 is forced down upon the uppermost flat portion to act as a positioning device for the socket 26.

When the firing pin member 90 is moved to the right as viewed in FIG. 4 by the hammer member 52, the pawl 112 of the socket rotating member 106 engages one of the teeth 114a of the star-wheel 114 and pivots counterclockwise to pass by the tooth 114a. When the hammer member 52 is reset to its cocked position by the first pull on the film wind member 30, the horizontal leg 104 engages the face 122a of a short vertical wall 122 on the firing pin member to return the same to its initial left hand position. The spring 92 is a relatively weak spring which retains the firing pin member in this position but is inadequate to effect a quick return thereof.

As the firing pin member 90 is moved to the left with the hammer member 52, the pawl 112 then engages the tooth 114a on the star-wheel and rotates the star-wheel in the embodiment illustrated approximately sixty degrees. This sixty degree movement imparted to the star-wheel 114 and the attached plate gear 116 imparts rotation to the pinion 118 and the gear-forming portion 119 of the socket 26, the ratio between the size of the pinion 118 and the size of the gear-forming portion 119 of the socket 26 being such that the sixty degree rotation of the star-wheel 114 will effect a ninety degree rotation of the socket 26 in a direction which will rotate the flash unit 28 in a clockwise direction as viewed in FIG. 1 (counterclockwise as viewed in FIG. 17).

Figure 16:
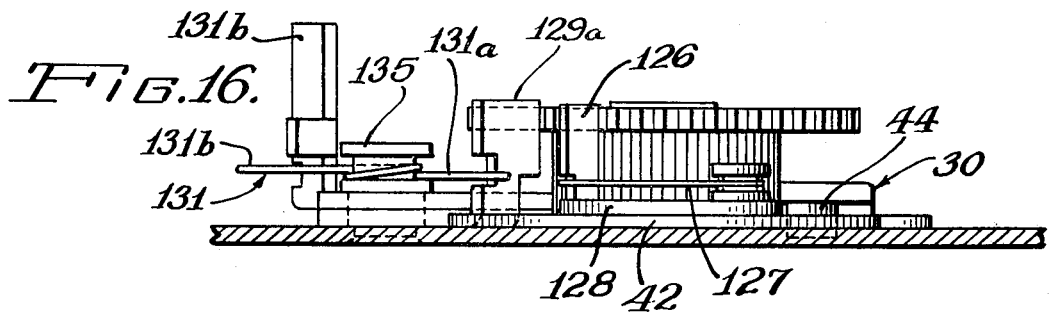
FIG. 16 is a view of the mechanism shown in FIG. 15 taken along section line 16—16 thereof.

Refer now to FIGS. 4, 15 and 16 for a detailed disclosure of the film winding mechanism briefly introduced previously, which converts the reciprocating movement of the film wind member 30 to the rotation of the drive gear 45 which engages a gear 121 of the film cartridge 123 shown in FIG. 18. As previously indicated, when the film wind member 30 is pulled into the dashed line position shown in FIG. 4, the pawl-carrying member 42 is moved in a counterclockwise direction. The pawl-carrying member carries an advancing pawl 126 attached to a pivoted plate 128, the pawl 126 urged by a spring 127 against the teeth of the drive gear 45 so that it advances the drive gear in the illustrated embodiment 5 tooth lengths upon the counterclockwise movement of the pawl member 42 and slips by the teeth of the drive gear 45 upon the return or clockwise movement of the member 42. The gear 45 is prevented from moving in a clockwise direction by a holding detent 129a carried on a pivoted member 129 supported on a pivot pin 135. A spring 131 winding around the pin 135 has an end 131a which applies a spring force on the pivoted member 129 which urges the holding detent 129a into engagement with the teeth of the gear 45. The holding detent 129a is so shaped that the drive gear 45 will slip by the latch member when the drive gear moves in a counterclockwise direction but prevents the movement of the gear 45 in a clockwise direction.

A film wind locking member generally indicated by reference numeral 130 is provided which prevents the rotation of the gear 45 and hence the reciprocation of the film wind member 30 coupled thereto when the aforementioned film metering member 84 is in a position within a film metering aperture in the film involved. To this end, the film wind locking member 130 has a locking projection 130a which engages the teeth of a ratchet wheel 133 which forms an integral extension of the gear 45. The locking projection 130a is urged into engagement with the ratchet wheel 133 by an end 131b of the aforementioned spring 131 opposite the the end 131a thereof, which end 131b is urged against a projection 130b on the film wind locking member 130 (FIG. 4).

Refer now more particularly to FIGS. 18-21 which illustrate more clearly the operation of the film metering member 84 in controlling the movement of the film wind locking member 130. The movement of the film metering member 84 also controls a trigger member locking means to be described which prevents the depression and operation of the trigger member 21 except when the film metering member 84 enters the film metering aperture identified by reference numeral 138 in the film identified by reference numeral 134.

In FIG. 18, which illustrates the condition of the camera parts during a film winding operation, the film cartridge 123 is shown supported within a film cartridge-receiving unit 132 forming part of the camera housing and the film metering aperture 138 is spaced from the film aperture entering end 84a of the film metering member 84. The film 134 is shown urged by a spring member 139 against a film plane defining flat surfaces 132a-132a of the film cartridge-receiving unit 132. The film cartridge-receiving unit 132 has a guide aperture 140 therein in which the film aperture entry end 84a of the film metering member 84 slides for movement toward and away from the film 134. The film metering member 84 has a base portion 84b which is guided for longitudinal sliding movement in apertures 142 and 144 in stationary walls 58 and 58' in the camera housing. A trigger locking spring 146 anchored to a lug on the base portion 84b of the film metering member 84, extends generally parallel to the wall 58' and terminates in a transverse entension 146a which enters an aperture in the wall 58' to extend into the path of movement of the trigger member 21, as long as the film metering member 84 does not extend into or through the film metering aperture 138 of the film 134.

The film metering member 84 has a lateral extension 84c against which is spring urged a portion 130b of the film locking member 130. The lateral extension 84c acts as an abutment for the film wind locking member 130 which pivots into a film wind locking or unlocking position depending upon the position of the film metering member 84. As previously indicated, the spring 131 has an end 131b engaging the portion 130b of the film wind locking member 130 to urge the film wind locking member in a clockwise direction so the locking projection 130a thereof engages the teeth of the ratchet wheel 133 when permitted to do so. The end 131b of the spring 131 also supplies the force which urges the portion 130b of the film locking member 130 against the lateral extension 84c of the film metering member 84. The angle or direction in which the force of the spring 131 is applied to the film metering member 84 is such that the effective spring force thereagainst is only a small fraction of the force which the spring applies to the locking projection 130a. Accordingly, the film metering member 84 is urged by the spring 131 relatively lightly toward and against the film 134, in comparison to the spring force applied to urge the film wind locking member 130 against the ratchet wheel 133. This result can be understood when it is realized that the spring force is applied to the film wind locking and film metering members at different angles where the components of the spring forces at these angles are substantially different.

In FIG. 18, where the film metering member 84 is out of alignment with the film aperture 138, the film wind locking member is in a position where the locking projection 130a is disengaged from the ratchet wheel 133, thereby permitting a film winding operation. Also, as soon as the end of the film metering member 84 is withdrawn from the film aperture 138, the transverse end 146a of the trigger locking spring 146 will be in the path of movement of the trigger member 21.

Refer now to FIG. 19 which illustrates the position of the film metering member 84 and the film wind locking member 30 when the film aperture entry end 84a of the film metering member 84 has entered a film metering aperture 138. In such case, the film metering member 84 is moved upwardly as viewed in FIG. 19 to a point where the transverse end 146a of the trigger locking spring 146 has been pulled by the film metering member out of the path of movement of the trigger member 21. Also, the film metering member 84 is now in a position where the lateral projection 84a thereof has permitted the film locking member 30 to be pointed in a clockwise direction to a position where its locking projection 130a is spring pressed into engagement with the teeth of the ratchet wheel 133, thereby to lock the film winding mechanism firmly in place.

Figure 20:
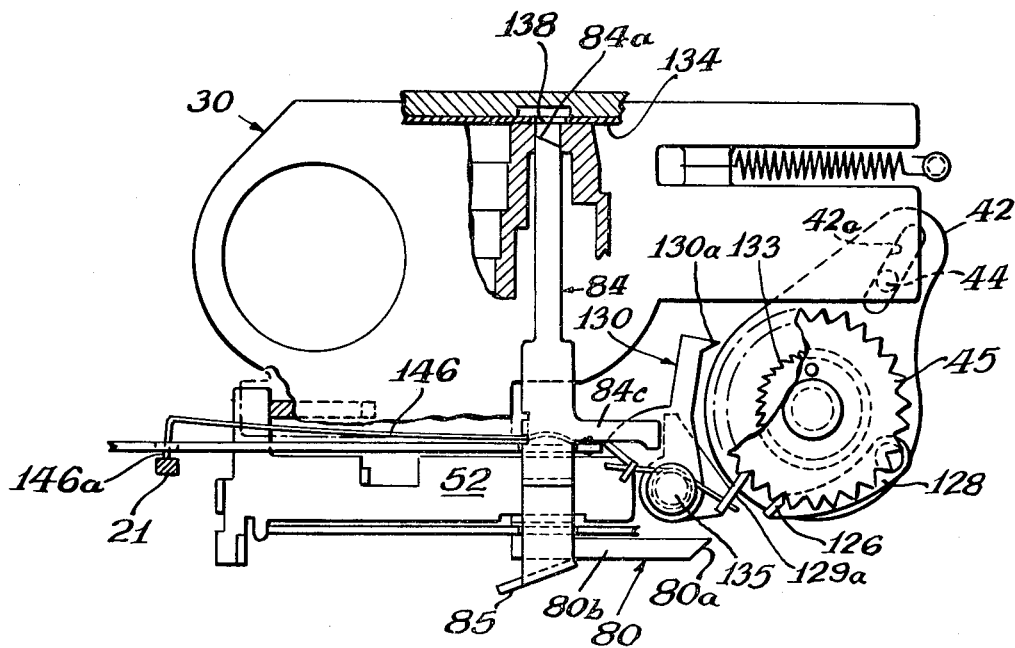
FIG. 20 is a view corresponding to FIGS. 18 and 19 after operation of the trigger member, where the film metering member has been removed from the film metering aperture and held out of contact with the film.
Figure 21:
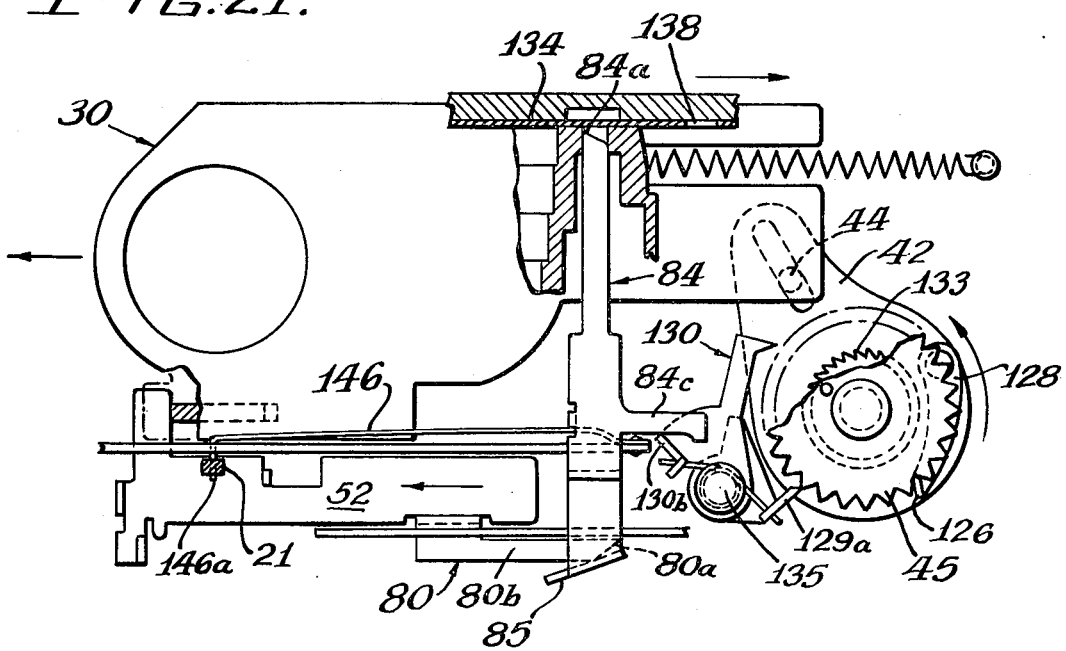
FIG. 21 is a view corresponding to FIGS. 18-20 during the first pull on the film winding member, where the film metering member is still held in a retracted position and the hammer member is being returned to its cocked position.

FIG. 20 illustrates the position of the film metering member 84 and the film wind locking member 130 immediately after the handle portion 21a of the trigger member has been depressed. As previously explained, this releases the hammer member 52 from its cocked position causing, among other things, the metering member operating arm 80 of the hammer member to engage the inclined shoulder 85 at the end of the film metering member 80 and withdraw the same from the film metering aperture 138 and hold it out of contact with the film. When the hammer member 52 is in its fully righthand position, the longitudinal edge portion of 80b of the metering member operating arm engages the inclined shoulder 85 of the film metering member 84 at a point far removed from the leading edge portion 80a thereof, so it will take an appreciable movement of the hammer member 52 to the left before the film metering member 84 is released for movement against the film 134. The reason for this is that, upon the initiation of a film winding operation by the first pull on the film wind member 130 as shown in FIG. 21, at least part of the lefthand movement of the film winding member 30 is taken up in removing slack from the film 134, so the film metering aperture 138 will remain stationary during part of the movement of the film wind member 30. The film metering member 84 much be held by the metering member operating arm 80 of the hammer member 52 in the retracted position shown in FIG. 20 until the film metering aperture 138 has been moved completely out of alignment with the film aperture entry end 84a of the film metering member 84. Thus, by the time the inclined leading edge portion 80a of the metering member operating arm 80 of the hammer member 52 has reached the point where it leaves contact with the inclined shoulder 85 of the film metering member 84, the film aperture 138 has been moved substantially out of alignment with the end of the film metering member 84. When the film wind member has been pulled fully to its left hand position, where the hammer member 52 has been returened to its fully cocked position, the leading edge portion 80a of the projecting portion 80 of the hammer member 52 will have left contact with the inclined shoulder portion 85 of the film metering member 84, thereby permitting the film metering member to rest against the film as shown in FIG. 18. Additional reciprocations of the film wind member are necessary to complete a film wind operation.

When the trigger member 21 is depressed to provide the condition illustrated in FIG. 20, the transverse end 146a of the trigger locking spring 146 will bear against the side of the trigger member (which includes a return spring making it self-resettable). Upon release of finger pressure therefrom, the trigger member will snap back behind the transverse end 146a of the spring 146, so the latter re-establishes its trigger locking position until the film aperture entry end 84a of the film metering member 84 can re-enter a film aperture 138 at the end of a film winding operation.

The trigger member 21 is also locked against depression by a tab 117c (FIGS. 23 and 24) which moves under the front edge of the trigger member 21 when the sliding door member begins to close the opening 14. The sliding door member has an opening 17b which uncovers the opening 14 when the sliding door member is in its open position.

Among the advantages of the film metering system just described is that it is extremely reliable and comprises only a few parts which can be made to occupy an extremely small space. Thus, for exmple, the multi-function purpose of the single spring member 131 is one unique aspect of the metering system which results in a great simplification of the number of parts and the spaced occupied thereby, to effect film metering and film locking operations as described.

Another feature of the camera constituting another aspect of the invention is the unique war in which the various portions of the camera are asembled.

While to a certain extent cameras have been heretofore made with the view in mind of reducing assembly costs, because of the particular way in which the parts and sub-assemblies were arranged, skilled persons were required to make many delicate and time consuming interconnections between parts of the sub-assemblies. In the camera assembly to be described, practically the entire camera can be assembled by dropping or sliding the various subassemblies or parts in place one on top or beside the other.

One aspect of the invention which contributes to the ease of assembly is that the housing includes upper and lower housing halves which enables the various parts therebetween to be stacked or placed one on top of the other and beside the other and then anchored in place by finally applying the upper housing half on top of the camera parts below to enclose the same and then securing the same to the lower housing half by screws or the like. In the exemplary embodiment of the invention, most of the parts which move during a picture taking, film winding and flash unitreceiving socket rotating operation form a single pre-assembled sub-assembly on a chassis unit which includes the aforesaid horizontal wall 38 which is the bottom wall of the chassis unit and the longitudinally extending vertical walls 58, 58' and 105. As previously indicated, the longitudinally extending vertical walls 58, 58' and 105 define therebetween guideways in which the hammer member 52 and the firing pin member 90 are longitudinally slidably disposed. The vertical wall 58' of the chassis unit forms a mounting wall for the shutter assembly 78 and the bottom horizontal wall 38 of the chassis unit forms the main horizontal mounting surface for the various rotatable parts which effect film winding, film locking and flash unit-receiving socket rotating operations. These parts are most advantageously all metal parts which can withstand the frictional wear forces involved indefinitely.

Vertical end wall portion 12a of the lower housing half 2b defines completely a bearing-forming opening 154 for the flash unit-receiving socket 26, which may be inserted into the bearing-forming opening 154 from within the lower housing half after the chassis unit sub-assembly has been dropped into place upon the bottom wall 6 of the lower housing half 2b. The pinion 118 will then be in meshed engagement with the gear-forming portion 119 of the socket 26.

Next, in the particular form of the invention illustrated, the film wind member 30 is dropped into place in the bottom wall slot 31 which is exposed by a cut out portion of the bottom wall 38 of the chassis unit 152, the film wind member 30 having a split end portion 30a containing a slot 30b for the spring 34 and riding over the slot-containing portion of the pawl-carrying member 42. As previously indicated a pin 44 depending from the film wind member 30 is poisitioned in slot 42a of the pawl-carrying member 42 and hook portion 34a of the spring 34 is then secured around pin 36 which extends upwardly from the bottom wall 38 of the chassis unit 152.

Film cartridge-receiving unit 132, in addition to acting as a receptacle for a film cartridge, also carries a rear lens element 16' of what is illustrated as a double miniscus lens system which includes front lens element 16 carried on front housing wall 8 behind the lens opening 14 thereof. The rear lens element 16' may be droppable into place within a slot 158 (FIG. 23) formed in the forwardly projecting portion 159 of the unit in which a lens opening 159' is located. The forwardly projecting portion 159 has an initially removed section 159" (FIG. 22) which encloses the lens 16' when adhesively secured in place. As perhaps best shown in FIG. 23, the film cartridge-receiving unit 132, which has the usual shaped cavities for receiving a film cartridge from the rear thereof, is dropped into a position at the rear of the bottom housing half 2b adjacent to the vertical end wall portion 10a thereof where the lens opening 159 thereof is located along lens axis 161 (FIG. 23).

There is provided a viewfinder and light meter housing unit 160 made preferably of synthetic plastic material which is shaped to extend around the front and lateral side of the film cartridge-receiving unit 132 (which is preferably made of such material) and to interfit with the same. The housing unit has a viewfinder and light meter portion 160a and a waterhouse aperture plate supporting and lens opening containing portion 160b. The confronting surfaces of the film cartridge-receiving unit 132 and the viewfinder and light meter housing unit 160 interfit at both their forwardly and laterally facing sides, as shown in FIG. 23. Thus, the film cartridge-receiving unit 132 has at the end thereof lower housing inclined and straight wall portions 162 and 163 which respectively engage similarly shaped and sized inclined and straight surfaces 164 and 166 of the viewfinder and light meter portion 160a thereof. Also, forwardly facing surfaces 167a, 167b etc. of the film cartridge-receiving unit 132 engage the similarly shaped rearwardly facing surfaces 169a, 169b etc. of the housing unit 160. The forwardly facing surfaces 181a, 181b etc. of the housing unit 160 engage corresponding rearwardly facing surfaces of the front wall 8 which is mounted in place during a later step in the assembly procedure. Similarly, other surfaces of the housing unit 160 and the film cartridge-receiving unit 132 will engage other adjacent surfaces of the different parts of the housing, so that these parts will be held laterally in place by the various surrounding wall surfaces.

The housing unit 160 has an outer wall surface 169 which abuts against the inner end of the socket 26 to retain the same in place in the bearing-forming opening 154 in the end wall portion 12a of the lower housing half 2b. The housing unit 160 also carries the aforementioned spring 120 which, when the housing unit 160 is dropped into place, will bear upon the uppermost flat portion 26a, 26c or 26d of the socket 26. The viewfinder and light meter portion 160a of the housing unit 160 defines an open to passageway 170 (FIGS. 22 and 23) in the defining walls of which are located a rear slot 172 in which a rear viewfinder lens 174 is dropped and a forward slot 176 into which a front viewfinder lens 178 is dropped.

The viewfinder and light meter portion 160a of the housing unit 160 has an inclined passageway 190 which intersects and inclines forwardly from a rear portion of the viewfinder passageway 170 and terminates behind and in alignment with the light meter opening 20 in the front wall 8. The defining walls of the light meter passageway 190 includes a slot 192 into which is dropped a lens element 194 and a slot 196 into which is dropped a light meter forming laminate body 198, the different layers of which laminate body are shown in FIG. 27 and comprise material which progressively reduces the intensity of the light passing therethrough. One of these layers 198a is a polarized light transmitting layer having a completely light transparent moon segment 198a' therebetween which can be a cut out portion in the layer 198a. Another layer 198b has a completely light transparent circular portion 198b' which can be a cut out portion which forms a circular continuation of the convex outer perimeter of the moon segment 198a'. The layer 198b also has completely light transparent sunburst-forming lines 198b" surrounding the sun-shaped completely light transparent portion 198b'. The third layer 198c of the laminate body 198 includes a completely light transparent portion 198c' which may be a cut out portion which is coextensive with the completely light transparent portion 198b' of the layer 198b.

As best shown in FIG. 25, rotatably mounted about a cylindrical pin-forming projection 200 within a recess 201 in the viewfinder and light meter housing unit 160 is a polaroid member 202 having gear teeth 202a formed along a portion of its perimeter and shoulder-forming projections 202b and 202c which limit the rotatable movement impartable thereto as these projections engage shoulders 201a and 201b in the recess 201. The polaroid member 202 extends into and is rotatable in a forward portion of the light meter pasageway 190, so that rotation of the polaroid member 202 will vary the angle of the polarization axis thereof. Accordingly, as the angle of the polarization axis of the polaroid member 202 varies from a position where it is parallel to the polarization axis of the polaroid material layer 198a, progressively less light will be allowed to pass through the laminate body 198 from the light meter opening 20 of the front wall of the camera housing.

Accordingly, light directed through the laminate body 198 passes therethrough without any light reduction of any significance through the portion of the body defined by the moon segment 198a'. The portion of the laminate body 198 coextensive with the outline of the completely light transparent sun-shaped portions 198b' and 198c' in the layers 198b and 198c are covered only by the light reducing material of the layer 198a and the portion of the laminate body 198 coextensive with the sunburst portions 198b" in the layer 198b is covered by the light reducing portions of the layers 198a and 198c. It can thus be seen that light directed through the laminate body 198 from the front thereof when progressively increased from relatively low through high intensity levels will bring the different symbols corresponding to the moon segment 198a', the sun-shaped completely light transparent portion 198b' and the sunburst design 198b" progressively in view in the viewfinder opening 19 in the rear wall 6. FIG. 28 shows the three basic symbols which appear in the viewfinder opening.

The slidable control member 199 includes a vertical waterhouse lens opening portion 99a having a series of progressively increasing openings 204 and a horizontally extending portion 199b having rack-forming teeth 206 formed in the front edge thereof. In any suitable way, distance indicating indicia 199c is placed on the horizontally extending portion 199b which are successively brought beneath window 27 when the associated openings 204 are in line with the lens axis 161. When the slide member 199 is dropped into place upon the housing unit 160, the rack-forming teeth 206 will mesh with the gear teeth 202a of the polaroid member 202. As best shown in FIG. 23, a longitudinal guide slot 208 is defined between spaced portions of the housing unit 160 and the chassis unit wall 58' to permit the slidable control member 199 to be moved longitudinally. The handle portion of the control member 22 extends upwardly from the horizontally extending portion 199b of the slidable control member 199 to project through the opening 23 in the top wall 4 of the upper housing half 2. As the slidable control member 99 is moved by the handle portion 22 of the slidable control member, various ones of the openings 204 are individually moved one at a time into lens opening 132b (FIG. 23) of the cartridge-receiving unit 132 to vary the lens opening through which light can pass through the lens system. The slidable control member 199 automatically snaps into the adjusted postions where the center lines of the various apertures 204 are respectively aligned with the lens axis 161 by the engagement of one of the slots 208 in the bottom edge of the vertical portion 199a of the slidable control member 199 with the pointed portion 219a of a spring member 219 fitting into a recess 221 (FIG. 30) centered below and opening 223 (FIG. 22) in the forwardly facing surface of the portion 160b of the view finder and light meter housing unit 160.

It can thus be seen that by a proper selection of the density of the polaroid member 202, the various layers of the laminate body 198 and the selection of the size and spacing of the openings 204 in the slidable control member 199 that adjustment of the slidable control member 199 to provide the sun symbol shown in the center portion of FIG. 28 will establish a proper lens opening for the taking of a proper picture. Thus, if the lens or F stop opening is too small to provide proper light, the moon segment will appear in the viewfinder opening 19 and the slidable control member will bring the sun-shaped symbol shown at the center of FIG. 28 into view as the slidable control member is moved in a direction to rotate the polaroid member 202 in a direction to let more light through the laminate body 198, which will bring a larger lens opening 204 opposite the lens axis 161. Excessive light conditions will bring the sunburst design into view in the viewfinder requiring the movement of the slidable control member 199 in the opposite direction to bring the sun-shaped symbol into view.

Next, the film metering member 84 can be inserted in place in the assembly through the aforementioned openings 142 and 144 in the walls 58 and 58' and into opening 140 in the film cartridge-receiving unit 132.

Either before or after the positioning of the film cartridge-receiving unit 163 and the viewfinder and light meter housing unit 160 on top of the chassis unit 152, the aforementioned flash control member 101 is dropped into place within a slot 211 in the vertical end wall portion 10b of the lower housing half 2 b, with the lateral arm 101b thereof extending an opening 213 into the interior of the lower housing half 2b. The flash control member is positioned so that the slot 101a in the lateral arm thereof fits over the abutment-forming member 100 carried on the firing pin member 90. (As previously indicated, the transverse end 100a on the abutment-forming member 100 is moved into the path of movement of a lug 104 on the hammer member 52 when the latter is released from its cocked position to impel the firing pin member into the socket 26 and the flash unit carried thereby, to effect a flash operation when the control member 101 is moved to the right as viewed in FIG. 22 or the left as viewed in FIG. 1.)

The next step in the assembly procedure is most advantageously the dropping into place of the vertical front wall 8 which fits into grooves 216b (see FIG. 23) formed in the interior of the lower housing half 2b. As best shown in FIGS. 23 and 30, the front wall 8 has projecting rearwardly therefrom a lens receiving portion 217 having a recess 223 in which is held by a ring 225 lens element 16 which forms with the other lens element 16' supported in the film cartridge-receiving unit 132 a double miniscus lens system between which is located the aforementioned shutter mechanism 78.

Next, the rear wall 9 is slid horizontally through slot 25b in the end wall portion 12b of the lower housing half 2b into grooves 218b formed in the rear portion of the lower housing half 2b. As previously indicated, the rear wall 9 can be moved horizontally into and out of the slot 25b by grasping the finger gripping portion 9a and pulling on the rear wall 6. The rear wall 9 is provided with suitable depressions 219—219 (FIGS. 3 and 29) each of which receives in snap lock relation a projecting nib 221 formed on the rear face of the viewfinder and light meter unit 160 when the rear wall 9 is respectively fully retracted within and fully extended from the housing.

As shown in FIGS. 22, 23 and 31, the aforementioned spring member 139 carried by the rear wall 6 is provided with a horizontally elongated opening 139a therein which is in alignment with a corresponding opening 227 in the rear wall 9 through which film frame numbers on the film can be visible from the rear of the camera. As previously indicated, the spring member 139 presses against the film and holds the same against shoulders or surfaces 132a—132a (FIG. 23) at the rear of the film cartridge-receiving unit 132.

Either before or after the assembly of the upper housing half 2a over the lower housing half, the trigger member 21 is pushed into place within an aperture 220 (FIGS. 25 and 32) formed in the top wall 4 of the housing. Extending laterally from the end wall portion 10a of the upper housing half is a spring-receiving portion 222 having an open top cup-shaped portion 222a into which a coil spring 224 is supported. The upper portion of the coil spring fits into a small recess 26 in the bottom face of the trigger member below the handle portion 21a thereof. The trigger member 21 has an outwardly projecting flange or shoulder portion 227 which, when the trigger member is pushed down against the pressure of the coil spring 224, will slip beneath shoulders 230 formed in the upper housing half, thereby locking the trigger member into place in the upper housing half. The trigger member extends down through an opening into the lower portion of the upper housing half where it is positioned in alignment with latch member 62 to free the hammer member 52 for movement to the right, to effect a shutter operation and film metering member withdrawing operation. FIG. 32 shows trigger release locking spring 146 with transverse end portion 146a thereof out of alignment with the bottom end portion of the trigger member 21. As previously indicated, the transverse end portion 146a of the spring member 146 moves beneath the bottom portion of the trigger member 21 to prevent the depression thereof immediately after the taking of a picture upon depression and release of the trigger member 21.

The assembly of the camera housing is almost completed by the superpositioning of the upper housing half 2a over the bottom housing half, so the confronting faces of the end wall portions 10a—10b and 12a—12b are brought into engagement. The upper housing half 2a has grooves 216a and 218a which fits over the top edges of the front and rear walls 8 and 9. The vertical end wall portion 12a of the upper housing half includes a semicircular aperture 231 which engages around the defining walls of the bearing-forming opening 154. Finally, the upper and lower housing halves are shown interconnected by three screws 232 (FIG. 25) which have heads recessed in depressions 234 in the upper surface of the top wall 4 of the upper housing half 2a and thread into apertures 236 in lowering housing half 2b. A cover plate 238 is then removably, adhesively secured within a groove 240 extending into the end wall portions 10a—12a thereof. This plate covers over the heads of the screws 232 and can be readily removed for servicing by stripping the same from the camera housing. The adhesive bond of the cover plate 238 can be readily broken by a manually applied force applied thereto to rip the same from the top of the housing.

As shown in FIGS. 29 and 30, the sub-assemblies described are sandwiched between the upper and lower housing halves 2a and 2b and are held immovably in place between the housing halves until the screws 232 are loosened. When the upper housing half is removed, the various sub-assemblies can be removed from (and hence also assembled in) the lower housing half without any screw or rivet unfastening operations or the like. While in the preferred form of the invention all the sub-assemblies can be removed without any screw or rivet unfastening operations, in accordance with the broadest aspect of the invention, one of a few of the sub-assemblies constituting a small proportion of the total number of sub-assemblies could be fastened in place with screws, rivets or the like but particularly in the case of the small pocket sized cameras, it is most advantageous that none of the basic sub-assemblies which are assembled in the lower housing half be held in place by screws, rivets or the like, since this would require very skilled assemblers performing delicate operations which would materially increase the cost of assembling the parts of the camera in the camera housing.

It should be apparent that the unique placement and arrangement of the parts making up the present camera constitutes an exceedingly simple camera to assemble and to service. If there is a defective part in one of the sub-assemblies described, rather than actually repair that particular sub-assembly, the entire sub-assembly can be more economically replaced during the repair operation. Since manual labor is normally a major expenditure in the repair of a camera, it can be seen that the simple manner in which the present camera can be assembled materially reduces both the cost of manufacture and servicing thereof. Also, because of the unique and simple construction of the camera described, the camera requires a relatively small number of parts which fact, together with the low cost of assembly, enables the camera to be manufactured at only a fraction of the cost of previously developed cameras carrying out the same or similar functions.

It should be understood that numerous modifications may be made in various parts of the camera described and shown in the drawings without deviating from the broader aspects of many of the features of the invention.

I claim:

1. In a pocket-sized still camera having a horizontally elongated housing formed by top and bottom walls, vertical front and rear walls extending between the front and rear margins of said top and bottom walls, and end walls extending between the side margins of the top, bottom, front and rear walls, the top and bottom walls of the housing being closely spaced relative to the front to back dimensions thereof and to the spacing between said housing end walls, to provide a relatively thin and narrow camera housing elongated in the direction between the end walls thereof and which can be readily placed in a shirt pocket when oriented so the longitudinal axis thereof is vertically oriented, said front wall having an opening behind which the camera lens means is located; exposed manually operable trigger means for operating shutter mechanism on the camera; a flash unit-receiving member mounted for rotation into a number of different operative stable positions and having an outer flash unit-receiving end exposed to the outside of the housing and adapted to support a multilamp flash unit having a number of flash lamp and reflector sections spaced around a central axis of symmetry thereof coextensive with the axis of rotation of the flash unit-receiving member, and exposed manually operable film winding means for advancing the film in the camera one frame position after the taking of a picture, the improvement wherein said flash unit-receiving member is positioned at one of said end walls of the housing so the axis of rotation of the flash unit-receiving member extends horizontally or transversely from the housing end wall, so the multilamp flash unit supported therein has its central axis of symmetry similarly extending horizontally or transversely of said housing end wall in a direction of the longitudinal dimension of the camera housing and the camera with the flash unit attached can be positioned comfortably in a shirt pocket or the like, there is provided exposed manually operable flash operation on-off control means operable at least when the flash unit is mounted in said flash unit-receiving member for movement between "on" and "off" positions, flash unit operating means in the housing responsive to the movement of the flash on-off control to the "on" position for rendering the flash lamp section in front of the flash unit supported on the flash unit-receiving member operative upon operation of said manually operable trigger means, said flash unit being inoperative when the flash on-off control is in its "off" position even when the flash unit is mounted on said flash unit-receiving member, whereby the multilamp flash unit need not be removed from the flash unit-receiving member if a flash operation is not desired, and flash unit rotation means responsive to the operation of said manually operable film winding means for effecting rotation of the flash unit-receiving member in a given direction to the next stable position thereof only in response to the first film winding operation after a picture is taken when the flash on-off control is in its "on" position and independently of the actual position of the flasher on-off control at the time the film winding operation takes place.

2. The camera of claim 1 wherein said camera housing has shutter means operative to expose film in the housing, a hammer member mounted for movement from an initial cocked position to a shutter operating position, operation of said manually operable trigger means releasing said hammer member for movement to said shutter operating position, said flash unit operating means includes a firing pin member mounted for movement between an inoperative position to an operative position where a portion of the firing pin member passes into a flash unit mounted on the flash unit-receiving member to trigger the flash unit into operation, and means associated with said firing pin member responsive only to the "on" position of said flash on-off control for coupling the movement of said hammer member of said firing pin member to move the latter from its inoperative to its operative position, said firing pin member being de-coupled from said hammer member when said flash on-off control is in its "off" position and the flash unit is mounted in the camera.

3. The camera of claim 2 wherein said camera has manually operable hammer member reset means and means responsive to the operation of said hammer member reset means for returning said hammer member to said initial cocked position after a picture taking operation, said firing pin member returning to said initial operative position when the hammer member is returned to its initial cocked position.

4. The camera of claim 2 wherein the speed of operation of the shutter mechanism thereof is a function of the speed of operation of the hammer member, and the shutter means is to operate at a given greatly reduced speed during flash operation, and said firing pin member when coupled for movement with the hammer member during flash operation acts as a drag force on the movement of the hammer member from said initial cocked position to a degree which substantially slows down the speed of operation of the hammer member and hence the speed of operation of said shutter mechanism to said given reduced speed.

5. The camera of claim 2 wherein the camera housing has reset means for returning said hammer member to said initial cocked position, said firing pin member returning to said initial operative position when the hammer member is returned to its initial cocked position independently of the position of the flash on-off control.

6. The camera of claim 5 wherein said reset means are means responsive to movement of said film wind means, and said flash unit rotating means includes means for rotating said flash unit-receiving member to a new position in response to the return movement of said hammer member to its cocked position by said reset means.

* * * * *